United States Patent
Yokokawa

(10) Patent No.: US 8,923,612 B2
(45) Date of Patent: Dec. 30, 2014

(54) IMAGE PROCESSING APPARATUS AND METHOD, AND PROGRAM

(75) Inventor: Masatoshi Yokokawa, Tokyo (JP)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 12/867,228

(22) PCT Filed: Dec. 18, 2009

(86) PCT No.: PCT/JP2009/071090
§ 371 (c)(1),
(2), (4) Date: Aug. 11, 2010

(87) PCT Pub. No.: WO2010/071189
PCT Pub. Date: Jun. 24, 2010

(65) Prior Publication Data
US 2011/0235905 A1 Sep. 29, 2011

(30) Foreign Application Priority Data
Dec. 18, 2008 (JP) ................. P2008-322450

(51) Int. Cl.
| | | |
|---|---|---|
| *G06K 9/46* | (2006.01) | |
| *G06T 7/00* | (2006.01) | |
| *H04N 1/64* | (2006.01) | |
| *H04N 1/40* | (2006.01) | |
| *G06T 5/00* | (2006.01) | |

(52) U.S. Cl.
CPC ................. *H04N 1/64* (2013.01); *G06T 7/0002* (2013.01); *G06T 2207/30168* (2013.01); *H04N 1/40068* (2013.01); *G06T 5/003* (2013.01)
USPC .......................................................... 382/165

(58) Field of Classification Search
USPC ................. 382/162, 165, 173, 232, 264, 280; 358/426; 348/349
See application file for complete search history.

(56) References Cited

U.S. PATENT DOCUMENTS

| | | | | |
|---|---|---|---|---|
| 5,453,844 | A | * | 9/1995 | George et al. ................. 382/264 |
| 2002/0080261 | A1 | * | 6/2002 | Kitamura et al. ............. 348/349 |

FOREIGN PATENT DOCUMENTS

| | | |
|---|---|---|
| JP | 2002-007591 | 3/2002 |
| JP | 2002-77591 | 3/2002 |

(Continued)

OTHER PUBLICATIONS

International Search Report from Japanese Patent Office for PCT/JP2009/071090, Dated Jan. 26, 2010.

(Continued)

*Primary Examiner* — Duy M Dang
(74) *Attorney, Agent, or Firm* — Finnegan Henderson Farabow Garrett & Dunner LLP

(57) ABSTRACT

The present invention relates to an image processing apparatus and method, and a program that are capable of displaying images more easily and effectively.

A degree-of-blur detecting unit 21 detects the degree of blur of an input image. The selecting unit 22 selects an image processing operation to be performed on the input image on the basis of a detection result of the degree of blur, and supplies the input image to a block that performs the selected image processing operation among a comic-style conversion unit 23 to a sharpness processing unit 28. The block supplied with the input image among the comic-style conversion unit 23 to the sharpness processing unit 28 performs the image processing operation on the input image and outputs it to an output unit 29. The present invention can be applied to an image processing apparatus.

10 Claims, 21 Drawing Sheets

(56) References Cited

FOREIGN PATENT DOCUMENTS

| JP | 2002-300373 | 10/2002 |
| JP | 2003-233799 | 8/2003 |
| JP | 2005-182196 | 7/2005 |
| JP | 2005-303983 | 10/2005 |
| JP | 2006-024192 | 1/2006 |
| JP | 2006-24192 | 1/2006 |
| JP | 2006-024193 | 1/2006 |

OTHER PUBLICATIONS

Office Action issued May 23, 2013 by Japan Patent Office in corresponding Japanese Application No. JP 2008-322450 (4 pages).

* cited by examiner

| NUMBER OF GRADATION LEVELS | 2 | 3 | 4 | 5 | 6 | 7 | 8 |
|---|---|---|---|---|---|---|---|
| WIDTH PER GRADATION LEVEL | 128 | 86 | 64 | 52 | 43 | 37 | 32 |

FIG. 4

| ORIGINAL PIXEL VALUE | 0-31 | 32-63 | 64-95 | 96-127 | 128-159 | 160-191 | 192-223 | 224-255 |
|---|---|---|---|---|---|---|---|---|
| PIXEL VALUE AFTER CONVERSION | 0 | 32 | 64 | 96 | 128 | 160 | 192 | 224 |

FIG. 8

| | BLUR | COMPLEXITY OF EDGE DISTRIBUTION | BOX SIZE | COMPLEXITY OF COLOR DISTRIBUTION | COLOR BIAS | FEATURES |
|---|---|---|---|---|---|---|
| DECREASE-COLOR PAINTING-STYLE CONVERSION PROCESS | BLURRED/ UNBLURRED | COMPLEX | LARGE/ SMALL | COMPLEX | NOT BIASED | DIRECTED TO PHOTO HAVING SCATTERED EDGES AND EXPRESSED WITH MANY COLORS |
| OVERPAINT PAINTING-STYLE CONVERSION PROCESS | BLURRED/ UNBLURRED | SIMPLE | SMALL | SIMPLE | BIASED | DIRECTED TO PHOTO HAVING SIMPLE EDGE AND COLOR DISTRIBUTIONS AND LARGE AMOUNT OF SPECIFIC COLOR |
| DIORAMA-STYLE CONVERSION PROCESS | BLURRED/ UNBLURRED | SIMPLE | SMALL | SIMPLE | NOT BIASED | DIRECTED TO PHOTO HAVING SMALL BOUNDING BOX AND SIMPLE COLOR DISTRIBUTION |
| ANIMATION-STYLE CONVERSION PROCESS | UNBLURRED | SIMPLE | LARGE/ SMALL | SIMPLE | BIASED | DIRECTED TO UNBLURRED PHOTO WITH SMALL NUMBER OF COLORS |
| COMIC-STYLE CONVERSION PROCESS | UNBLURRED | SIMPLE | LARGE/ SMALL | COMPLEX | NOT BIASED | DIRECTED TO UNBLURRED PHOTO WITH SIMPLE EDGE DISTRIBUTION, UNRELATED TO COLOR |

FIG. 9

|  | DEGREE OF BLUR | EDGE COMPLEXITY | BOX SIZE | COLOR DISTRIBUTION COMPLEXITY | DEGREE OF COLOR BIAS |
|---|---|---|---|---|---|
| DECREASE-COLOR PAINTING-STYLE CONVERSION PROCESS |  | × |  | × | ○ |
| OVERPAINT PAINTING-STYLE CONVERSION PROCESS |  | ○ | ○ | ○ | × |
| DIORAMA-STYLE CONVERSION PROCESS |  | ○ | ○ | ○ | ○ |
| ANIMATION-STYLE CONVERSION PROCESS | ○ | ○ |  | ○ | × |
| COMIC-STYLE CONVERSION PROCESS | ○ | ○ |  | × | ○ |

IMAGE PROCESSING APPARATUS AND METHOD, AND PROGRAM

TECHNICAL FIELD

The present invention relates to an image processing apparatus and method, and a program, and particularly relates to an image processing apparatus and method, and a program that are capable of presenting images more easily and effectively.

BACKGROUND ART

Conventionally, a so-called slide-show function has been known in which a plurality of images are displayed in order. For example, using the slide-show function enables a user to appreciate images captured by a camera by displaying the images in order.

In such a slide-show function, fade-in, fade-out, slide-in, and slide-out can be performed on images while the images are being displayed. Also, a display method has been suggested in which feature regions are extracted from an image to be displayed and a part of the image is subjected to zooming and displayed on the basis of the number of the extracted feature regions in a case where images are displayed in a slide show (e.g., see PTL 1).

CITATION LIST

Patent Literature

PTL 1: Japanese Unexamined Patent Application Publication No. 2005-182196

SUMMARY OF INVENTION

Technical Problem

However, image display effects of fade-in, zooming, and the like are monotonous. Also, the impact obtained from images captured by a user himself/herself during a slide show is low because the user is familiar with the scenes (subjects) of the images, which may cause the user to become bored of appreciating the images.

Furthermore, images to be displayed in a slide show are selected by specifying a folder or the like that stores images captured by a user, and thus the images to be displayed include blurred images generated by motion blur or the like in many cases. If a blurred image is displayed during a slide show, the user may feel unsatisfied.

As described above, the foregoing technology is incapable of displaying images more effectively. On the other hand, in a known technology, a user specifies a predetermined region of an image and specifies an effect that can be obtained by processing the image, whereby the specified region of the image is processed. By using such a technology, a so-called special effect can be performed on images to be displayed in a slide show. However, in such a case, a blurred image can be effectively displayed in particular, but the user has to specify an image or region on which a special effect is to be performed and select a special effect each time, which is inconvenient.

The present invention has been made in view of these circumstances, and is directed to enabling easier and more effective display of images.

Solution to Problem

An image processing apparatus according to a first aspect of the present invention includes detecting means for detecting a degree of blur of an input image on the basis of the input image, selecting means for selecting any of a plurality of image processing operations for subjecting the input image to processing by reducing an information amount of information included in the input image on the basis of a detection result of the degree of blur, and image processing means for performing the selected image processing operation on the input image.

The image processing operation may be a process of reducing at least one of a resolution of the input image, colors, the number of gradation levels of a pixel value of a pixel of the input image, a texture, edges, and a bit rate.

The selecting means may be caused to select any of a number of predetermined image processing operations in a case where a value indicating the degree of blur is equal to or larger than a predetermined threshold, and select any of a number of other image processing operations of a combination different from the number of image processing operations in a case where the value indicating the degree of blur is smaller than the threshold.

The selecting means may be caused to select an image processing operation on the basis of the value indicating the degree of blur and frequencies of past selection of the respective image processing operations.

An image processing method or program according to the first aspect of the present invention includes the steps of detecting a degree of blur of an input image on the basis of the input image, selecting any of a plurality of image processing operations for subjecting the input image to processing by reducing an information amount of information included in the input image on the basis of a detection result of the degree of blur, and performing the selected image processing operation on the input image.

In the first aspect of the present invention, the degree of blur of the input image is detected on the basis of the input image, any of a plurality of image processing operations for subjecting the input image to processing by reducing an information amount of information included in the input image is selected on the basis of a detection result of the degree of blur, and the selected image processing operation is performed on the input image.

An image processing apparatus according to a second aspect of the present invention includes extracting means for extracting feature quantities of a plurality of features from an input image on the basis of the input image, selecting means for selecting any of a plurality of image processing operations for subjecting the input image to processing by reducing an information amount of information included in the input image on the basis of the feature quantities of the plurality of features, and image processing means for performing the selected image processing operation on the input image.

At least one of a resolution of the input image, a color distribution, a color bias, the number of gradation levels of a pixel value of a pixel of the input image, a degree of blur, an edge quantity, an edge distribution, a texture quantity, and a texture distribution may be extracted as the feature quantity from the input image.

An image processing method or program according to the second aspect of the present invention includes the steps of extracting feature quantities of a plurality of features from an input image on the basis of the input image, selecting any of a plurality of image processing operations for subjecting the input image to processing by reducing an information amount of information included in the input image on the basis of the feature quantities of the plurality of features, and performing the selected image processing operation on the input image.

In the second aspect of the present invention, feature quantities of a plurality of features are extracted from an input image on the basis of the input image, any of a plurality of image processing operations for subjecting the input image to processing by reducing an information amount of information included in the input image is selected on the basis of the feature quantities of the plurality of features, and the selected image processing operation is performed on the input image.

An image processing apparatus according to a third aspect of the present invention includes generating means for generating subject specifying information for specifying a region of a subject in an input image by extracting a first feature quantity of a feature held in the region of the subject from the input image, detecting means for detecting, on the basis of the input image and the subject specifying information, a degree of blur of a subject region, which is the region of the subject in the input image, and a degree of blur of a background region, which is a region other than the subject region in the input image, extracting means for extracting a second feature quantity of a plurality of features different from the degrees of blur from the subject region and the background region on the basis of the input image, selecting means for selecting any of a plurality of image processing operations for subjecting the input image to processing by reducing an information amount of information included in the input image on the basis of the degrees of blur and the second feature quantity and image processing means for performing the selected image processing operation on at least one of the subject region and the background region of the input image.

The selecting means may be caused to select image processing operations for the subject region and the background region, respectively, and the image processing means may be caused to perform the selected image processing operations on the subject region and the background region, respectively.

The selecting means may be caused to select an image processing operation for a region having a higher degree of blur among the subject region and the background region, and the image processing means may be caused to perform the selected image processing operation on the region having a higher degree of blur.

An image processing method or program according to the third aspect of the present invention includes the steps of generating subject specifying information for specifying a region of a subject in an input image by extracting a first feature quantity of a feature held in the region of the subject from the input image, detecting, on the basis of the input image and the subject specifying information, a degree of blur of a subject region, which is the region of the subject in the input image, and a degree of blur of a background region, which is a region other than the subject region in the input image, extracting a second feature quantity of a plurality of features different from the degrees of blur from the subject region and the background region on the basis of the input image, selecting any of a plurality of image processing operations for subjecting the input image to processing by reducing an information amount of information included in the input image on the basis of the degrees of blur and the second feature quantity, and performing the selected image processing operation on at least one of the subject region and the background region of the input image.

In the third aspect of the present invention, subject specifying information for specifying a region of a subject in an input image is generated by extracting a first feature quantity of a feature held in the region of the subject from the input image, a degree of blur of a subject region, which is the region of the subject in the input image, and a degree of blur of a background region, which is a region other than the subject region in the input image, are detected on the basis of the input image and the subject specifying information, a second feature quantity of a plurality of features different from the degrees of blur is extracted from the subject region and the background region on the basis of the input image, any of a plurality of image processing operations for subjecting the input image to processing by reducing an information amount of information included in the input image is selected on the basis of the degrees of blur and the second feature quantity, and the selected image processing operation is performed on at least one of the subject region and the background region of the input image.

Advantageous Effects of Invention

According to the first aspect of the present invention, an image can be displayed more easily and effectively.

Also, according to the second aspect of the present invention, an image can be displayed more easily and effectively.

Furthermore, according to the third aspect of the present invention, an image can be displayed more easily and effectively.

BRIEF DESCRIPTION OF DRAWINGS

FIG. 4 is a diagram illustrating the pixel values before conversion and after conversion in a decrease-color painting style conversion process.

FIG. 8 is a diagram illustrating features of respective image processing operations.

FIG. 9 is a diagram illustrating relationships between individual image processing operations and feature quantities.

DESCRIPTION OF EMBODIMENTS

Hereinafter, embodiments to which the present invention is applied will be described with reference to the drawings.

<First Embodiment>

[Configuration of Image Processing Apparatus]

Figure 1:
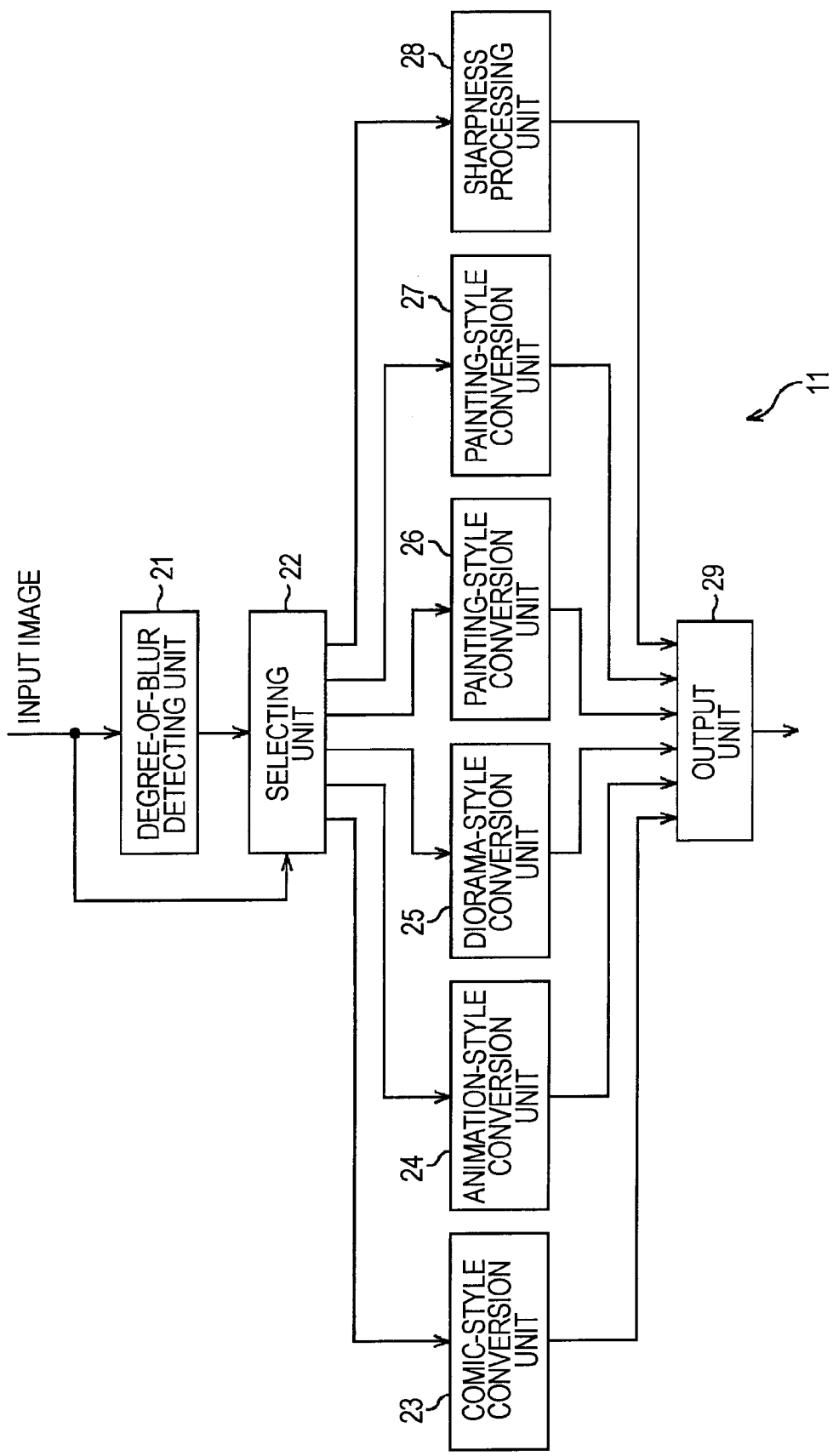
FIG. 1 is a diagram illustrating a configuration example of an embodiment of an image processing apparatus to which the present invention is applied.

FIG. 1 is a diagram illustrating a configuration example of an embodiment of an image processing apparatus to which the present invention is applied.

An image processing apparatus 11 includes a degree-of-blur detecting unit 21, a selecting unit 22, a comic-style conversion unit 23, an animation-style conversion unit 24, a diorama-style conversion unit 25, a painting-style conversion unit 26, a painting-style conversion unit 27, a sharpness processing unit 28, and an output unit 29.

A plurality of input images to be displayed in a slide show are sequentially input to the image processing apparatus 11. The image processing apparatus 11 performs image processing operations on the input images, thereby processing the input images to convert them into output images, and outputs the images. The input images are images captured by an imaging apparatus, such as a camera, for example.

The degree-of-blur detecting unit 21 detects the degree of blur of each of the input images on the basis of the input image supplied thereto, and supplies a detection result thereof to the selecting unit 22. Blur of the input image includes a so-called motion blur that is caused by a movement of an imaging apparatus, in addition to defocus that is caused by deviation of a focal position. The selecting unit 22 selects any of a plurality of predetermined image processing operations that is to be performed on the input image on the basis of the detection result supplied from the degree-of-blur detecting unit 21.

The image processing operation performed on the input image is basically a process of decreasing an information amount of information held in the input image, that is, at least any of the resolution of the input image, the number of colors, the number of gradation levels of pixel values of pixels of the input image, a texture quantity, an edge quantity, and a bit rate. The image processing operation is selected from among a comic-style conversion process, an animation-style conversion process, a diorama-style conversion process, a painting-style conversion process, and a sharpness process.

Here, the comic-style conversion process is a process of decreasing colors of an input image so as to convert the input image into a comic-style image. The animation-style conversion process is a process of decreasing a texture of an input image so as to convert one region of similar colors in the input image into a region of one color.

Also, the diorama-style conversion process is a process of giving uniform perspective to an input image. The painting-style conversion process is a process of converting an input image into a painting-like image. The painting-style conversion process includes a process of decreasing the number of gradation levels of pixel values of pixels of an input image (hereinafter also referred to as decrease-color painting-style conversion process) and a process of further performing coloring using a mask on the input image on which the decrease-color painting-style conversion process has been performed (hereinafter also referred to as overpaint painting-style conversion process). Furthermore, the sharpness process is a process of enhancing edges in an input image.

After selecting an image processing operation, the selecting unit 22 supplies the input image supplied thereto to a block that performs the selected image processing operation among the comic-style conversion unit 23 to the sharpness processing unit 28.

The comic-style conversion unit 23 holds a filter for performing a comic-style conversion process, performs a filter process using the filter held therein, that is, a comic-style conversion process, on an input image supplied from the selecting unit 22, and supplies an output image obtained thereby to the output unit 29. The output image that can be obtained in the comic-style conversion unit 23 is an image that can be obtained by performing a comic-style conversion process on an input image.

The animation-style conversion unit 24 holds a filter for performing an animation-style conversion process, performs a filter process using the filter held therein, that is, an animation-style conversion process, on an input image supplied from the selecting unit 22, and supplies an output image obtained thereby to the output unit 29. The diorama-style conversion unit 25 holds a filter for performing a diorama-style conversion process, performs a filter process using the filter held therein, that is, a diorama-style conversion process, on an input image supplied from the selecting unit 22, and supplies an output image obtained thereby to the output unit 29.

The painting-style conversion unit 26 holds a filter for performing a decrease-color painting-style conversion process, performs a filter process using the filter held therein on an input image supplied from the selecting unit 22, and supplies an output image obtained thereby to the output unit 29. The painting-style conversion unit 27 holds a filter for performing an overpaint painting-style conversion process, performs a filter process using the filter held therein on an input image supplied from the selecting unit 22, and supplies an output image obtained thereby to the output unit 29.

The sharpness processing unit 28 holds a filter for performing a sharpness process, performs a filter process using the filter held therein on an input image supplied from the selecting unit 22, and supplies an output image obtained thereby to the output unit 29. The output unit 29 outputs, to a display device (not illustrated), the output image supplied from any of the comic-style conversion unit 23 to the sharpness processing unit 28, the output image serving as an image to be displayed in a slide show, so that the output image is displayed.

Next, a description will be given about the comic-style conversion process, animation-style conversion process, diorama-style conversion process, decrease-color painting-style conversion process, and overpaint painting-style conversion process.

First, in the comic-style conversion process, a filter process is performed on an input image using a filter for extracting edges, such as a Laplacian filter, and a binarization process is performed on an image obtained thereby. Furthermore, an expansion/contraction process is performed on the binarized image, so that ununiform contour lines are corrected. Note that an image obtained by performing an expansion/contraction process on a binarized image is also called a contour image hereinafter.

Figures 2, 3:
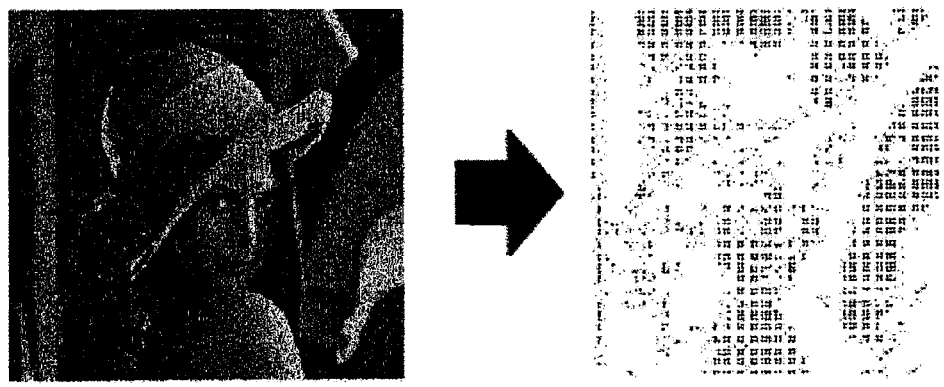
FIG. 2 is a diagram illustrating a comic-style conversion process.
FIG. 3 is a diagram illustrating the number of gradation levels before conversion corresponding to one gradation level after conversion with a decrease-color painting-style conversion process.

Also, as illustrated in FIG. 2, a point set composed of only pixels having a predetermined luminance value of an input image is obtained as texture. In FIG. 2, an input image is illustrated on the left side of the figure, and the texture is illustrated on the right side of the figure.

This texture is an image formed of binary numbers same as those of the input image, for example, white and black colors. In the texture, the pixel values of pixels at the same positions as pixels having a predetermined luminance value of the input image are values corresponding to black, and the pixel values of the other pixels are values corresponding to white.

The texture obtained in this manner is combined with the contour image, and an image obtained thereby is regarded as an output image obtained through the comic-style conversion process (hereinafter also referred to as comic-style output image). This comic-style output image has a feature in that the entire image is formed with a contour-line expression, that is, simple lines and patterns, and that the image is a monochrome image. In other words, the comic-style output image is obtained by enhancing edges in the input image and changing the input image into a monochrome image.

Also, in the animation-style conversion process, a filter process using a Laplacian filter or the like is performed on an input image, a binarization process is performed on an image obtained thereby, and furthermore, an expansion/contraction process is performed on the binarized image. Accordingly, a contour image of the input image can be obtained.

Furthermore, with a same-color determination process using a threshold performed on each pixel of the input image, a region of the same color of the input image, more specifically, a region composed of pixels of similar colors, is segmented. Accordingly, in the input image, a region composed of pixels that are adjoining to each other and that are determined to have the same color in the same-color determination process is regarded as one segment. For example, the number of colors at segmentation is about ten. Then, a process of setting an average color of pixels in a segment as the color of the segment is performed on each segment in the input image, and an image obtained thereby is combined with the contour image, so that an output image is generated.

The output image obtained through the animation-style conversion process (hereinafter also referred to as animation-style output image) is equivalent to a comic-style output image with colors. That is, the animation-style output image is generated by enhancing edges in the input image and painting the same segment in the input image with the same color.

Next, in the diorama-style conversion process, a linear conversion process is performed on an input image, and contrast adjustment is performed on the input image. Furthermore, a filter process using a Gaussian filter is performed on a peripheral portion, which is a portion except the vicinity of the center of the contrast-adjusted input image, so that the peripheral portion is blurred. The image obtained in this manner is regarded as an output image obtained through the diorama-style conversion process (hereinafter also referred to as diorama-style output image). The diorama-style output image has a feature in that the depth of field is uniform and that the contrast ratio is high, that is, there are many regions of underexposure and overexposure.

Additionally, the diorama-style conversion process may be any process as long as an algorithm for giving uniform perspective to an image or an algorithm for narrowing a field of view of an image is applied. For example, a process of adjusting focus by performing a linear conversion process on an input image and further performing a deconvolution process may be regarded as the diorama-style conversion process.

Also, in the decrease-color painting-style conversion process, a target pixel of an input image is regarded as a target pixel, a predetermined region having the target pixel at the center is regarded as a target region, and dominant values of pixel values of R (red), G (green), and B (blue) of the pixels in the target region are regarded as pixel values of respective components R, G, and B of the target pixel. For example, histograms are generated for components of the respective colors R, G, and B, and the value of the most frequent bin in the histograms, that is, the pixel value of a color component, is regarded as the pixel value of the target pixel.

In this way, the pixel values of the respective components R, G, and B are newly determined for the respective pixels in the input image, and the pixel values are changed. Then, a gradation conversion process of decreasing the number of gradation levels of pixel values of color components of respective pixels is further performed on an image obtained thereby. Then, the image obtained through the gradation conversion process is regarded as an output image obtained through the decrease-color painting-style conversion process (hereinafter also referred to as decrease-color painting-style output image).

Normally, the pixel value of a pixel is expressed by 256 levels of gradation, and is any value from 0 to 255. In the gradation conversion process, the pixel values of the pixels in the input image are converted into pixel values of the number of gradation levels smaller than 256, as illustrated in FIG. 3 for example.

In FIG. 3, the numbers of gradation levels after conversion are shown in the field "number of gradation levels", and the numbers of gradation levels before conversion corresponding to 1 gradation level after conversion are shown in the field "width per gradation level". For example, in a case where the number of gradation levels after conversion is "8", 1 gradation level after conversion corresponds to 32 gradation levels before conversion. That is, a pixel value of sequential 32 gradation levels before conversion is regarded as a pixel value of the same gradation after conversion.

Also, in a case where a gradation conversion process is performed in which pixel values of components of respective colors of the pixels in an input image are decreased from 256 gradation levels to 8 gradation levels, the pixel values are converted using the conversion table illustrated in FIG. 4. In FIG. 4, ranges of pixel values of 256 gradation levels before conversion are shown in the field "original pixel value", and pixel values of 8 gradation levels after conversion are shown in the field "pixel value after conversion". Therefore, in a case where the pixel value of an R component of a target pixel before conversion is a value in the range from "0" to "31", for example, the pixel value of an R component of the pixel after conversion is "0".

In this way, after the pixel values of components of the respective colors R, G, and B of the input image have been converted, a decrease-color painting-style output image can be obtained. Note that the number of gradation levels after conversion has an influence on a finish state of the decrease-color painting-style output image, and thus may be arbitrarily set by a user.

Figure 5:
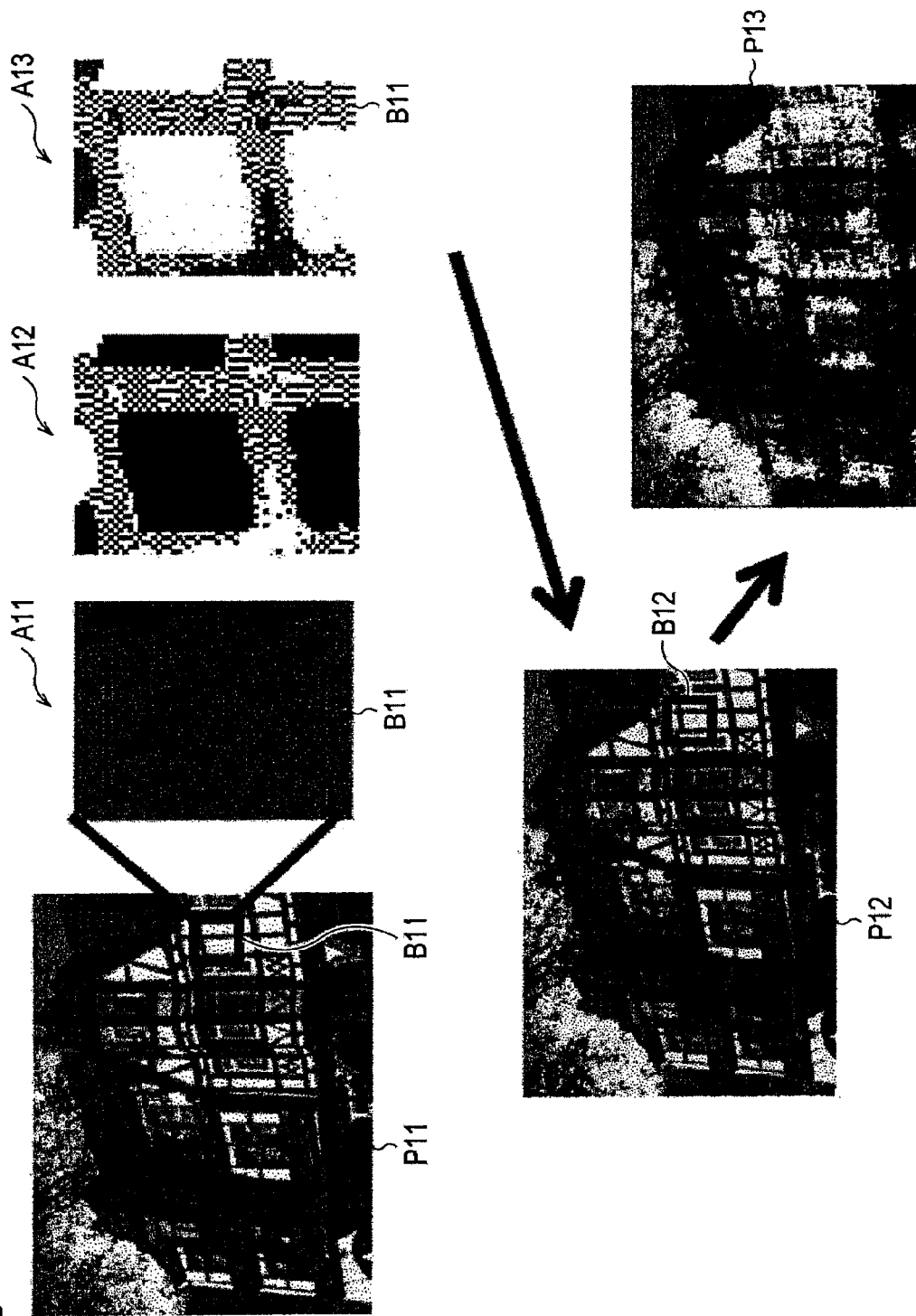
FIG. 5 is a diagram illustrating an overpaint painting-style conversion process.

On the other hand, in the overpaint painting-style conversion process, a decrease-color painting-style conversion process is performed on an input image, and an output image is generated using the decrease-color painting-style image obtained thereby and the input image. Specifically, as illustrated in FIG. 5, a block B11, which is a region having an arbitrary pixel of an input image P11 at the center, is selected.

Here, as indicated by an arrow A11, it is assumed that the region of the block B11 is painted the color of the central pixel positioned at the center of the block B11 (hereinafter also referred to as representative color). For example, it is assumed that the region of the block B11 is painted the representative color using a mask, and a mask used for painting with the color is generated as indicated by an arrow A12.

With this mask, only pixels having a color similar to the representative color in the block B11 are painted the representative color, and pixels having a color not similar to the representative color are not painted and are left as is. For example, the degree of similarity between the color of each pixel and the representative color is determined using Euclidean distance or Manhattan distance, and pixels having a degree of similarity equal to a threshold or more are painted the representative color. When the block B11 is painted the representative color using this mask, the color of pixels having a color similar to the color of the central pixel of the block B11 is changed to the representative color as indicated by an arrow A13.

In the overpaint painting-style conversion process, a block B12, which is a region of a decrease-color painting-style image P12 obtained from an input image and which is at the same position as the block B11 of the input image, is painted the representative color by using the mask generated in this manner. That is, the pixel values of the pixels in the block B12 at the same positions as the pixels painted the representative color in the block B11 indicated by the arrow A13 are changed to the value representing the representative color.

In this way, a process of generating a mask by selecting an arbitrary block from the input image P11 and pasting (painting) the representative color onto a block of the decrease-color painting-style image P12 at the same position as the block by using the mask is performed a predetermined number of times, and the image obtained thereby is regarded as an output image P13. Hereinafter, an output image obtained through an overpaint painting-style conversion process is also referred to as overpaint painting-style output image.

Additionally, the predetermined number of times the process of pasting the representative color is repeated may be determined in accordance with the complexity of edges of an input image and the size of a block serving as a unit of process (e.g., block B11), for example, or may be determined in advance.

Also, the mask used in the overpaint painting-style conversion process is used to provide a finer expression on the decrease-color painting-style image P12. Thus, in a case where an overpaint painting-style output image is to be made as a rough-touch image, the mask may not be used. In such a case, the pixel value of each pixel in the block B12 is a value representing the representative color of the block B11.

[Description about Operation of Image Processing Apparatus]

Also, when input images to be displayed in a slide show are sequentially supplied to the image processing apparatus 11, the image processing apparatus 11 starts an image conversion process, which is a process of converting the supplied input images into output images and outputting the images.

Hereinafter, the image conversion process performed by the image processing apparatus 11 will be described with reference to the flowchart in FIG. 6.

In step S11, the degree-of-blur detecting unit 21 detects the degree of blur of an input image supplied thereto on the basis of the input image.

For example, the degree-of-blur detecting unit 21 divides the input image into some blocks and detects an edge strength of each block. Then, the degree-of-blur detecting unit 21 calculates a difference between a minimum value and a maximum value of the edge strength of each block in the input image, the difference serving as a dynamic range, and sets an edge reference value and an extraction reference value on the basis of the dynamic range.

Here, the edge reference value is a value that is used to determine whether a pixel is a pixel constituting an edge in the input image (hereinafter referred to as edge point) or not. The extraction reference value is a value that is used to determine whether the amount of extracted edge points is appropriate or not.

The degree-of-blur detecting unit 21 extracts pixels as edge points included in a block where a detected edge strength is equal to or higher than the edge reference value (hereinafter referred to as edge block) in each block of the input image, and compares an extraction amount thereof with the extraction reference value. Then, as a result of the comparison of the extraction amount, in a case where the extraction amount of edge points is inappropriate, the degree-of-blur detecting unit 21 repeats the process of extracting edge points by adjusting the edge reference value until an appropriate extraction amount is obtained.

Then, after an appropriate amount of edge points has been extracted, the degree-of-blur detecting unit 21 analyses whether blur exists at the extracted edge points, and calculates the degree of blur, which indicates the degree of blur of the input image, on the basis of an analysis result. As the value of the degree of blur is larger, the degree of blur of a subject in the input image is higher. The calculated degree of blur is supplied from the degree-of-blur detecting unit 21 to the selecting unit 22.

In step S12, the selecting unit 22 determines whether the input image is a blurred image on the basis of the degree of blur supplied from the degree-of-blur detecting unit 21. For example, in a case where the degree of blur is equal to or higher than a predetermined threshold, the input image is determined to be a blurred image.

In a case where it is determined in step S12 that the input image is not a blurred image, the process proceeds to step S13. In step S13, the selecting unit 22 selects one filter from among filters that are predetermined for an unblurred image on the basis of the frequencies in use of the filters held in the comic-style conversion unit 23 to the sharpness processing unit 28.

For example, in the image processing apparatus 11, filters used for a blurred input image and filters used for an unblurred input image are predetermined, and one filter is selected from filter groups of different combinations in accordance with whether the input image is blurred or not.

Specifically, for an unblurred input image, an output image is generated by using any of the filter for the comic-style conversion process, the filter for the animation-style conversion process, the filter for the diorama-style conversion process, the filter for the decrease-color painting-style conversion process, and the filter for the overpaint painting-style conversion process.

That is, any image processing operation of the comic-style conversion process, animation-style conversion process, diorama-style conversion process, decrease-color painting-style conversion process, and overpaint painting-style conversion process is performed on an unblurred input image to generate an output image. In a case where an input image is unblurred, edges can be reliably extracted from the input image, and thus a filter can be selected from among various filters, such as a filter for a process of using edge enhancement.

Additionally, hereinafter, a filter group including the filter for the comic-style conversion process, the filter for the animation-style conversion process, the filter for the diorama-style conversion process, the filter for the decrease-color painting-style conversion process, and the filter for the overpaint painting-style conversion process, which are used for an unblurred input image, is also referred to as without-blur filter group.

In addition, the selecting unit 22 holds the frequencies in use of the filters held in the comic-style conversion unit 23 to the sharpness processing unit 28. The selecting unit 22 selects a filter having the lowest frequency in use from the without-blur filter group on the basis of the frequencies in use of the respective filters held therein.

After selecting the filter, the selecting unit 22 supplies the input image supplied thereto to the block that has the selected filter, and the process proceeds to step S15. For example, in a case where the filter for the decrease-color painting-style conversion process is selected, the selecting unit 22 supplies the input image to the painting-style conversion unit 26, and adds "1" to the frequency in use of the filter for the decrease-color painting-style conversion process.

On the other hand, in a case where it is determined in step S12 that the input image is a blurred image, the process proceeds to step S14. In step S14, the selecting unit 22 selects one filter from among filters that are predetermined for a blurred image on the basis of the frequencies in use of the filters held in the comic-style conversion unit 23 to the sharpness processing unit 28.

For example, for a blurred input image, an output image is generated by using any of the filter for the sharpness process, the filter for the decrease-color painting-style conversion process, and the filter for the diorama-style conversion process.

That is, any image processing operation of the sharpness process, decrease-color painting-style conversion process, and diorama-style conversion process is performed on a blurred input image to generate an output image. In a case where an input image is blurred, sharp edges cannot be obtained from the input image, and thus an image processing operation that does not require edges is selected and the input image is converted into an output image with a low degree of blur.

In this way, by performing the sharpness process, decrease-color painting-style conversion process, or diorama-style conversion process on a blurred input image, the blurred input image can be converted into an unblurred output image that is acceptable for appreciation by a user. That is, the output image is generated by processing the entire input image. Thus, when the input image is an image captured by a user, the output image is an image of a view different from that at capturing by the user, for example, an image like a painting of rough touches. Therefore, by displaying the obtained output image, an impact higher than that of monotonous display effects of fade-in, zooming, and the like can be given to the user without causing the user to feel unsatisfied.

Additionally, hereinafter, a filter group including the filter for the sharpness process, the filter for the decrease-color painting-style conversion process, and the filter for the diorama-style conversion process, which are used for a blurred input image, is also referred to as with-blur filter group.

The selecting unit 22 selects a filter having the lowest frequency in use from the with-blur filter group on the basis of the frequencies in use of the respective filters held therein.

Then, the selecting unit 22 supplies the input image supplied thereto to the block that has the selected filter, and the process proceeds to step S15. For example, in a case where the filter for the diorama-style conversion process is selected, the selecting unit 22 supplies the input image to the diorama-style conversion unit 25, and adds "1" to the frequency in use of the filter for the diorama-style conversion process.

After the filter is selected in step S13 or step S14, the block supplied with the input image from the selecting unit 22 among the comic-style conversion unit 23 to the sharpness processing unit 28 performs a filter process on the input image supplied thereto in step S15.

For example, in a case where the filter for the diorama-style conversion process is selected by the selecting unit 22 and where the input image is supplied from the selecting unit 22 to the diorama-style converting unit 25, the diorama-style conversion unit 25 performs a filter process using the filter held therein on the supplied input image. That is, the diorama-style conversion unit 25 performs a diorama-style conversion process on the input image so as to convert the input image into a diorama-style output image.

Then, the diorama-style conversion unit 25 supplies the diorama-style output image obtained through the diorama-style conversion process to the output unit 29, and the process proceeds to step S16.

In step S16, the output unit 29 outputs the output image supplied thereto to a display device (not illustrated), so as to display the output image on the display device.

In step S17, the image processing apparatus 11 determines whether the process is to be ended or not. For example, in a case where all the input images to be displayed in a slide show have been output after being converted into output images, it is determined that the process is to be ended.

In a case where it is determined in step S17 that the process is not to be ended, the process returns to step S11, and the foregoing process is repeated. That is, the next input image is converted into an output image.

On the other hand, in a case where it is determined in step S17 that the process is to be ended, the individual units of the image processing apparatus 11 end processes that are being performed, and the image conversion process ends.

In this way, the image processing apparatus 11 detects the degree of blur of each input image and performs an image processing operation on the input image on the basis of a detection result, thereby converting the input image into an output image.

In this way, by performing an image processing operation selected in accordance with the degree of blur on an input image, even a blurred input image can be converted into an output image acceptable for appreciation by a user and can be displayed. Accordingly, a blurred image that is conventionally abandoned can be effectively used, and the user can be caused to feel freshness.

Also, by performing an image processing operation on an unblurred image and displaying an output image obtained thereby, a high impact can be given to the user who appreciates the output image, and the user can be caused to enjoy more. Furthermore, in the image processing apparatus 11, a filter (image processing operation) is selected in accordance with the frequencies in use of the respective filters, and thus it can be prevented that the same filter is continuously selected. Accordingly, it can be prevented that the user becomes bored of appreciating output images.

As described above, according to the image processing apparatus 11, an output image having a texture different from that at the capturing of an input image can be generated by performing a simple process of selecting an appropriate filter on the basis of the degree of blur of the input image and processing the input image using the selected filter. Accordingly, an image can be displayed more effectively for the user.

Additionally, according to the above description, output images obtained from input images are displayed in a slide show. Alternatively, output images may be recorded, or only one output image may be displayed. Also, during a slide show, display of an image may be switched by performing fade-in or fade-out from any one of an output image and an input image as original to the other. Furthermore, a plurality of output images obtained through filter processes using different filters performed on the same input image may be displayed while performing fade-in or fade-out thereon.

<Second Embodiment>

[Configuration of Image Processing Apparatus]

Furthermore, according to the above description, an image processing operation (filter) is selected in accordance with the frequencies in use. Alternatively, feature quantities of some features may be extracted from an input image, and a filter may be selected in accordance with those feature quantities. For example, at least one of a resolution of the input image, a color distribution, a color bias, the number of gradation levels of pixel values of pixels of the input image, the degree of blur, an edge quantity, an edge distribution, a texture quantity, and a texture distribution is extracted from the input image and is regarded as a feature quantity for selecting a filter.

Figure 7:
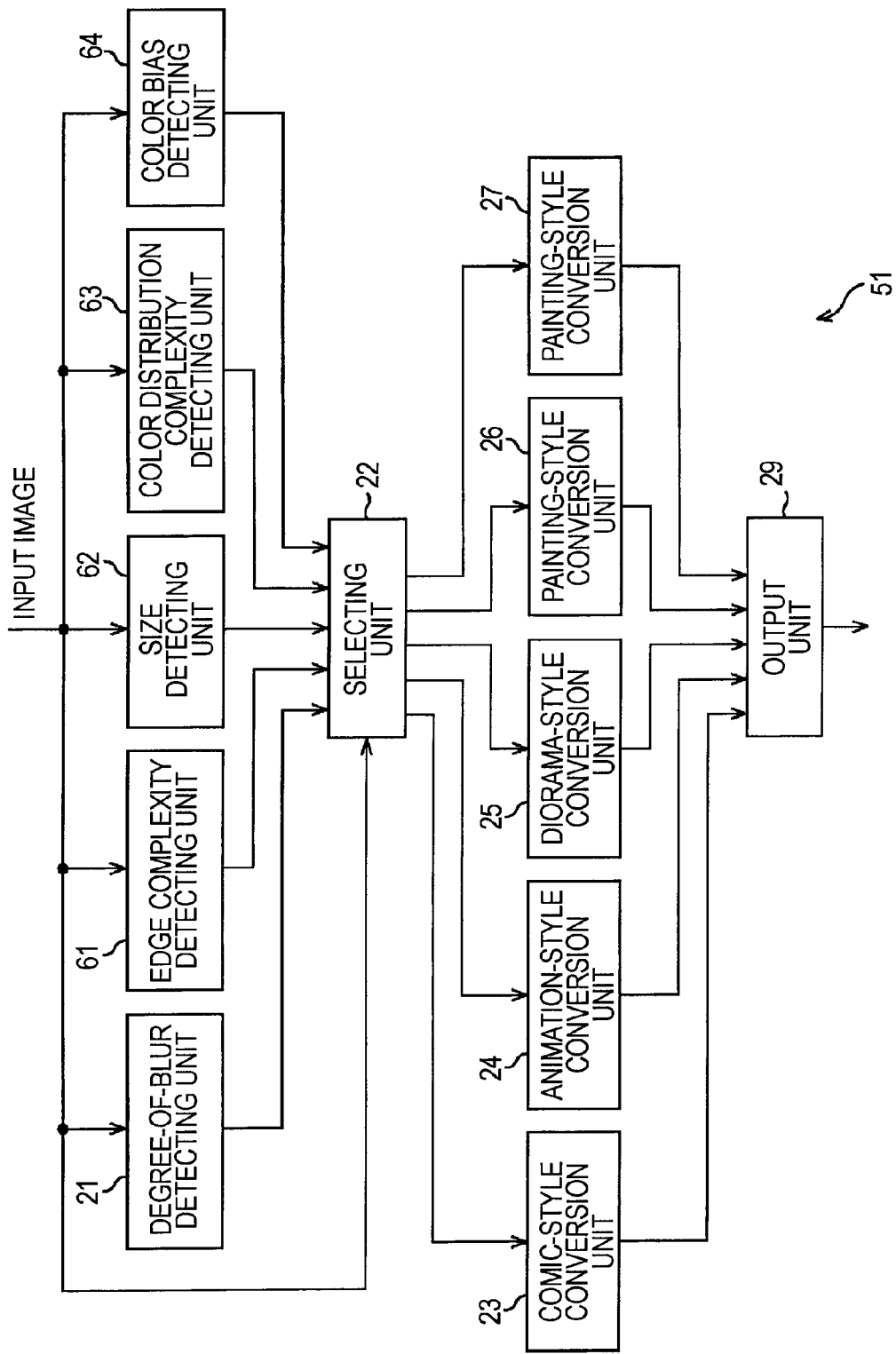
FIG. 7 is a diagram illustrating another configuration example of the image processing apparatus.

In such a case, the image processing apparatus has the configuration illustrated in FIG. 7, for example. Note that, in FIG. 7, the parts corresponding to those in FIG. 1 are denoted by the same reference numerals, and that the description thereof will be omitted.

The image processing apparatus 51 illustrated in FIG. 7 includes the degree-of-blur detecting unit 21, an edge complexity detecting unit 61, a size detecting unit 62, a color distribution complexity detecting unit 63, a color bias detecting unit 64, the selecting unit 22 to the painting-style conversion unit 27, and the output unit 29. Also, an input image supplied to the image processing apparatus 51 is supplied to the degree-of-blur detecting unit 21, the edge complexity detecting unit 61 to the color bias detecting unit 64, and the selecting unit 22.

Each of the degree-of-blur detecting unit 21 and the edge complexity detecting unit 61 to the color bias detecting unit 64 extracts a feature quantity of an input image supplied thereto from the input image, and supplies a score indicating the feature quantity to the selecting unit 22. Then, the selecting unit 22 selects an image processing operation to be performed on the input image on the basis of those scores.

The degree-of-blur detecting unit 21 detects the degree of blur as a feature quantity from the input image, and supplies a detection result, serving as a score indicating a feature quantity, to the selecting unit 22.

The edge complexity detecting unit 61 calculates edge complexity that indicates an edge quantity included in the input image supplied thereto on the basis of the input image, and supplies it to the selecting unit 22. The value (score) of edge complexity is larger as more edges are included in the input image and as the pattern of the input image is more complex.

The size detecting unit 62 calculates a rectangular region surrounding a boundary of an object (subject) in the input image supplied thereto, that is, a box size indicating the size of a so-called bounding box, on the basis of the input image, and supplies it to the selecting unit 22. The value (score) of this box size is larger as the size of the bounding box is larger and as the degree of tightness of a portion where edges concentrate in the input image is lower.

The color distribution complexity detecting unit 63 calculates color distribution complexity indicating the complexity of a color distribution in the input image supplied thereto on the basis of the input image, and supplies it to the selecting unit 22. The value (score) of color distribution complexity is larger as the color distribution is more complex and as the pattern of the input image is more complex.

The color bias detecting unit 64 calculates the degree of color bias indicating the degree of bias of colors in the input image supplied thereto on the basis of the input image, and supplies it to the selecting unit 22. The value (score) of the degree of color bias is larger as the degree of color bias in the input image is higher.

The selecting unit 22 selects an image processing operation (filter) to be performed on the input image on the basis of the feature quantities supplied from the degree-of-blur detecting unit 21 and the edge complexity detecting unit 61 to the color bias detecting unit 64, that is, the degree of blur, edge complexity, box size, color distribution complexity, and degree of color bias.

Specifically, the image processing operation is selected from among the comic-style conversion process, animation-style conversion process, diorama-style conversion process, decrease-color painting-style conversion process, and over-paint painting-style conversion process. The selecting unit 22 supplies the input image supplied thereto to the block that performs the selected image processing operation among the comic-style conversion unit 23 to the painting-style conversion unit 27.

By using the feature quantities of the respective features extracted from the input image, the selecting unit 22 can know which image processing operation is more effective for the input image supplied thereto, as illustrated in FIG. 8, for example. FIG. 8 illustrates the effectiveness of each image processing operation in individual states of blur, complexity of an edge distribution, box size, complexity of a color distribution, and a color bias.

For example, the decrease-color painting-style conversion process is effective for an image that has edges scattered and that is expressed with many colors. That is, the decrease-color painting-style conversion process is effective for an image that has a complex edge distribution and a complex color distribution and that has no color bias. An input image having such features can be converted into an output image that is predicted to be more tolerable for appreciation by performing the decrease-color painting-style conversion process. Additionally, blurred/unblurred and the size of bounding box in the input image have no influence on whether the decrease-color painting-style conversion process is effective for the input image or not.

Also, the overpaint painting-style conversion process is effective for an image that has a simple edge distribution and a simple color distribution and that has a large portion of a specific color. That is, the overpaint painting-style conversion process is effective for an image that has a simple edge distribution and a simple color distribution, that has a small size of bounding box, and that has a color bias. Additionally, blurred/unblurred in an input image has no influence on whether the overpaint painting-style conversion process is effective for the input image or not.

Furthermore, the diorama-style conversion process is effective for an image that has a simple color distribution and that has a small size of bounding box. That is, the diorama-style conversion process is effective for an image that has a simple edge distribution and a simple color distribution, that has a small size of bounding box, and that has no color bias. Additionally, blurred/unblurred in an input image has no influence on whether the diorama-style conversion process is effective for the input image or not.

Furthermore, the animation-style conversion process is effective for an image that is unblurred and that is formed of a small number of colors. That is, the animation-style conversion process is effective for an image that is unblurred, that has a simple edge distribution and a simple color distribution, and that has a color bias. Additionally, the size of bounding box in an input image has no influence on whether the animation-style conversion process is effective for the input image or not.

Furthermore, the comic-style conversion process is effective for an image that is unblurred and that has a simple edge distribution. That is, the comic-style conversion process is effective for an image that is unblurred, that has a simple edge distribution and a complex color distribution, and that has no color bias. Additionally, the size of bounding box in an input image has no influence on whether the comic-style conversion process is effective for the input image or not. Also, a color distribution and a color bias have little influence on whether the comic-style conversion process is effective or not.

In this way, an image processing operation effective for an input image can be determined by determining the features of the input image. Accordingly, the selecting unit 22 selects an image processing operation on the basis of the feature quantities of the respective features of the input image as illustrated in FIG. 9, for example.

In FIG. 9, a symbol "○" (circle) or "x" (cross) is shown in individual fields of "degree of blur", "edge complexity", "box size", "color distribution complexity", and "degree of color bias", which indicate individual features. The symbol "○" (circle) represents a case where a feature quantity (score) is smaller than a predetermined threshold, whereas the symbol "x" (cross) represents a case where a feature quantity is equal to or larger than the threshold.

Specifically, the selecting unit 22 selects an image processing operation by comparing the feature quantities of the respective features with the thresholds that are determined for the respective features.

For example, in a case where the edge complexity and color distribution complexity are equal to or higher than the thresholds and where the degree of color bias is lower than the threshold, the decrease-color painting-style conversion process is selected. Also, in a case where the edge complexity, box size, and color distribution complexity are lower than the thresholds and where the degree of color bias is equal to or higher than the threshold, the overpaint painting-style conversion process is selected.

Furthermore, in a case where the edge complexity, box size, color distribution complexity, and degree of color bias are lower than the thresholds, the diorama-style conversion process is selected. In a case where the degree of blur, edge complexity, and color distribution complexity are lower than the thresholds and where the degree of color bias is equal to or higher than the threshold, the animation-style conversion process is selected. Furthermore, in a case where the degree of blur, edge complexity, and degree of color bias are under the thresholds and where the color distribution complexity is equal to or higher than the threshold, the comic-style conversion process is selected.

Next, the configuration of each of the edge complexity detecting unit 61 to the color bias detecting unit 64 in FIG. 7 will be described with reference to FIGS. 10 to 13.

Figure 10:
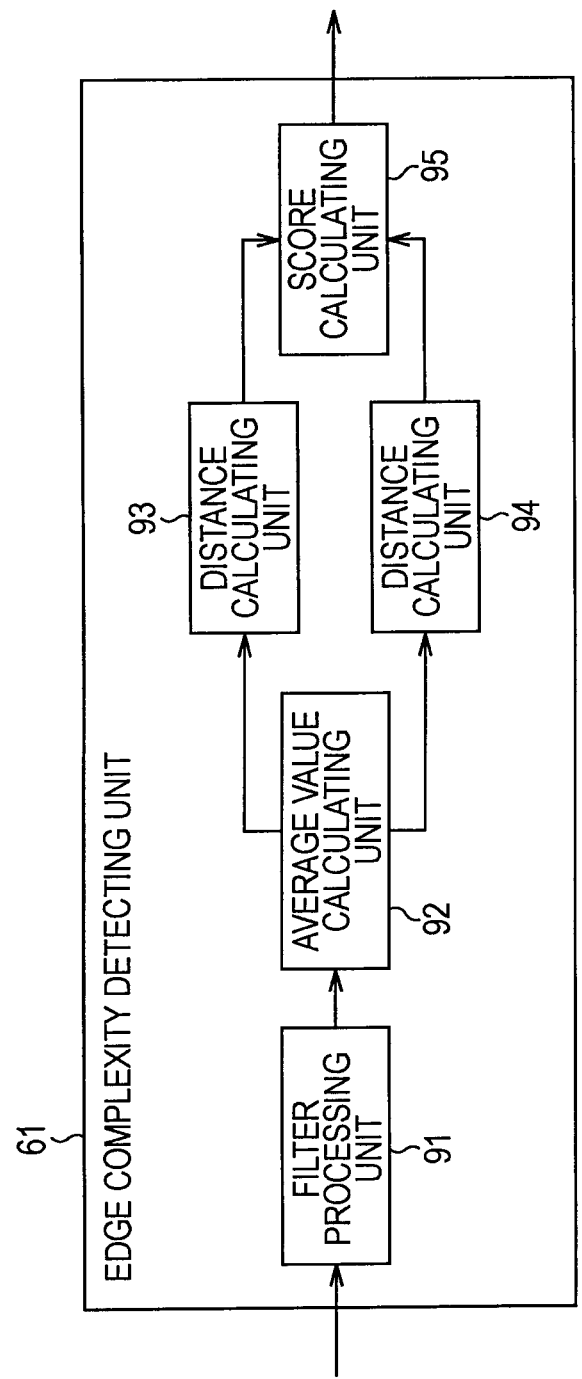
FIG. 10 is a diagram illustrating a configuration example of an edge complexity detecting unit.

FIG. 10 is a diagram illustrating a more specific configuration example of the edge complexity detecting unit 61.

The edge complexity detecting unit 61 includes a filter processing unit 91, an average value calculating unit 92, a distance calculating unit 93, a distance calculating unit 94, and a score calculating unit 95.

The filter processing unit 91 generates an R image, a G image, and a B image that are composed of only components of R, G, and B, respectively, of an input image supplied thereto, performs a filter process for extracting edges on those R image, G image, and B image, and supplies them to the average value calculating unit 92. The average value calculating unit 92 calculates average values in respective pixels of the R image, G image, and B image supplied from the filter processing unit 91 so as to generate one image, and supplies it to the distance calculating unit 93 and the distance calculating unit 94.

The distance calculating unit 93 calculates the distance between the image supplied from the average value calculating unit 92 and a prepared simple image, and supplies it to the score calculating unit 95. Here, the simple image is an image that is captured well by a professional or the like and that has a low edge complexity, that is, a typically highly-evaluated image.

The distance calculating unit 94 calculates the distance between the image supplied from the average calculating unit 92 and a prepared complex image, and supplies it to the score calculating unit 95. Here, the complex image is an image that is poorly captured by an amateur or the like and that has a high edge complexity, that is, a typically low-evaluated image.

The score calculating unit 95 calculates an edge complexity by using the distance supplied from the distance calculating unit 93 and the distance supplied from the distance calculating unit 94, and supplies it to the selecting unit 22.

Figure 11:
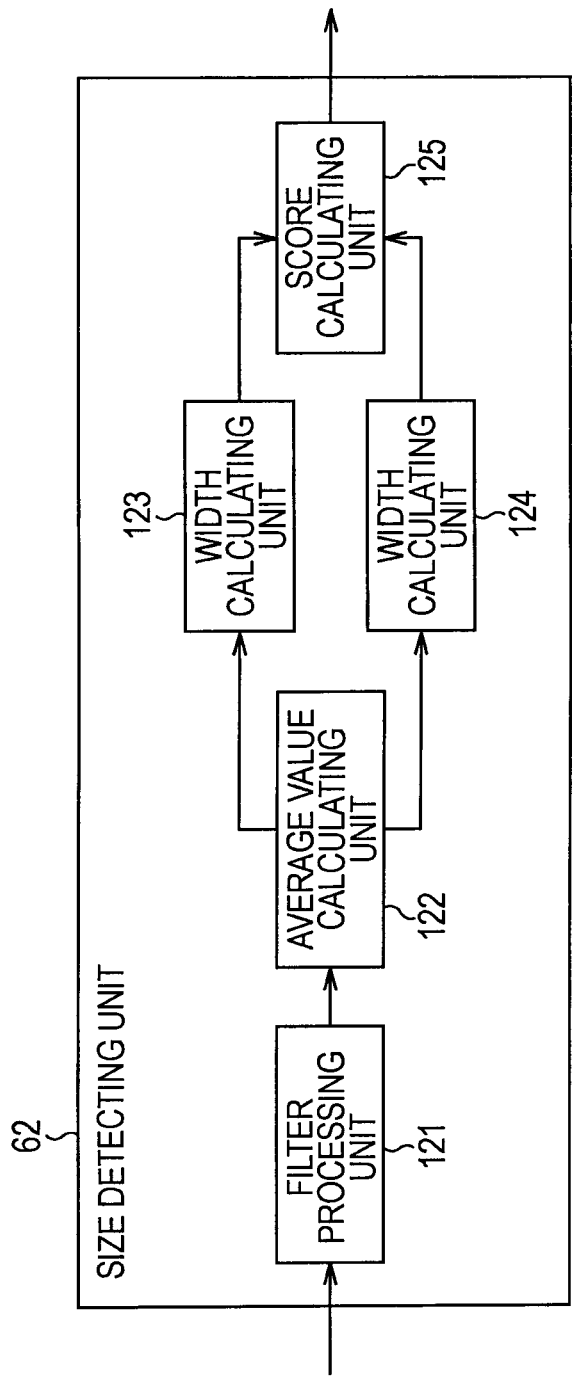
FIG. 11 is a diagram illustrating a configuration example of a size detecting unit.

FIG. 11 is a diagram illustrating a more specific configuration example of the size detecting unit 62 in FIG. 7.

The size detecting unit 62 includes a filter processing unit 121, an average value calculating unit 122, a width calculating unit 123, a width calculating unit 124, and a score calculating unit 125. Note that, since the filter processing unit 121 and the average value calculating unit 122 are similar to the filter processing unit 91 and the average value calculating unit 92 in FIG. 10, the description thereof is omitted.

The width calculating unit 123 calculates the width in a predetermined direction (hereinafter regarded as x direction) of a bounding box in an input image by using the image supplied from the average value calculating unit 122, and supplies it to the score calculating unit 125. The width calculating unit 124 calculates the width in the direction vertical to the x direction (hereinafter regarded as y direction) of the bounding box in the input image by using the image supplied from the average value calculating unit 122, and supplies it to the score calculating unit 125.

The score calculating unit 125 calculates a box size on the basis of the widths in the x direction and y direction supplied from the width calculating unit 123 and the width calculating unit 124, and supplies it to the selecting unit 22.

Figure 12:
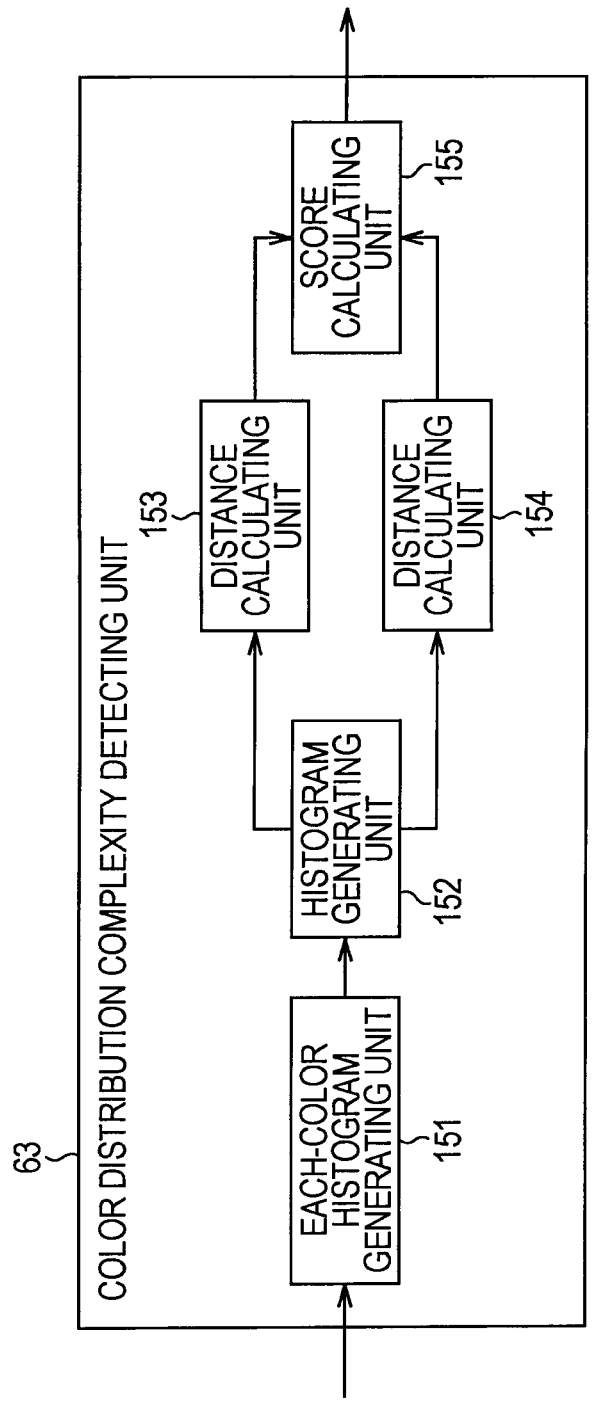
FIG. 12 is a diagram illustrating a configuration example of a color distribution complexity detecting unit.

FIG. 12 is a diagram illustrating a more specific configuration example of the color distribution complexity detecting unit 63 in FIG. 7.

The color distribution complexity detecting unit 63 includes an each-color histogram generating unit 151, a histogram generating unit 152, a distance calculating unit 153, a distance calculating unit 154, and a score calculating unit 155.

The each-color histogram generating unit 151 generates histograms of respective colors from an input image supplied thereto, with the ranges of pixel values of respective components of R, G, and B of the input image serving as bins, and supplies them to the histogram generating unit 152. The histogram generating unit 152 generates one histogram from the histograms of the respective color components of R, G, and B supplied from the each-color histogram generating unit 151, and supplies it to the distance calculating unit 153 and the distance calculating unit 154.

The distance calculating unit 153 calculates the distance between the histogram supplied from the histogram generating unit 152 and a histogram obtained from a prepared simple image, and supplies it to the score calculating unit 155. The distance calculating unit 154 calculates the distance between the histogram supplied from the histogram generating unit 152 and a histogram obtained from a prepared complex image, and supplies it to the score calculating unit 155.

The score calculating unit 155 calculates a color distribution complexity on the basis of the distances supplied from the distance calculating unit 153 and the distance calculating unit 154, and supplies it to the selecting unit 22.

Figure 13:
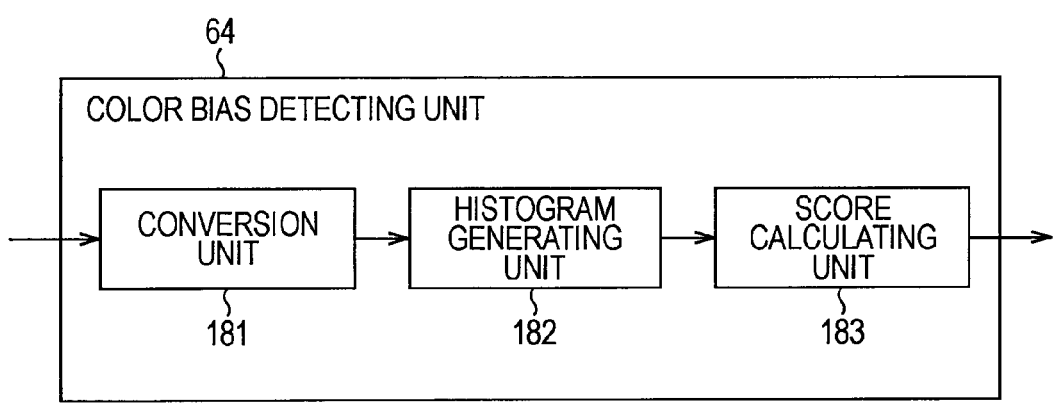
FIG. 13 is a diagram illustrating a configuration example of a color bias detecting unit.

FIG. 13 is a diagram illustrating a more specific configuration example of the color bias detecting unit 64 in FIG. 7.

The color bias detecting unit 64 includes a conversion unit 181, a histogram generating unit 182, and a score calculating unit 183.

The conversion unit 181 converts an input image supplied thereto from an image having pixel values of respective components of R, G, and B into an image having pixel values of respective components of H (hue), S (saturation), and V (value of color), and supplies it to the histogram generating unit 182. The histogram generating unit 182 generates a histogram of pixels satisfying a predetermined condition of the input image on the basis of the input image having the components of H, S, and V supplied from the conversion unit 181, and supplies it to the score calculating unit 183.

The score calculating unit 183 calculates the degree of color bias on the basis of the histogram supplied from the histogram generating unit 182, and supplies it to the selecting unit 22.

[Description about Operation of Image Processing Apparatus]

Next, an image conversion process performed by the image processing apparatus 51 in FIG. 7 will be described with reference to the flowchart in FIG. 14.

Figure 6:
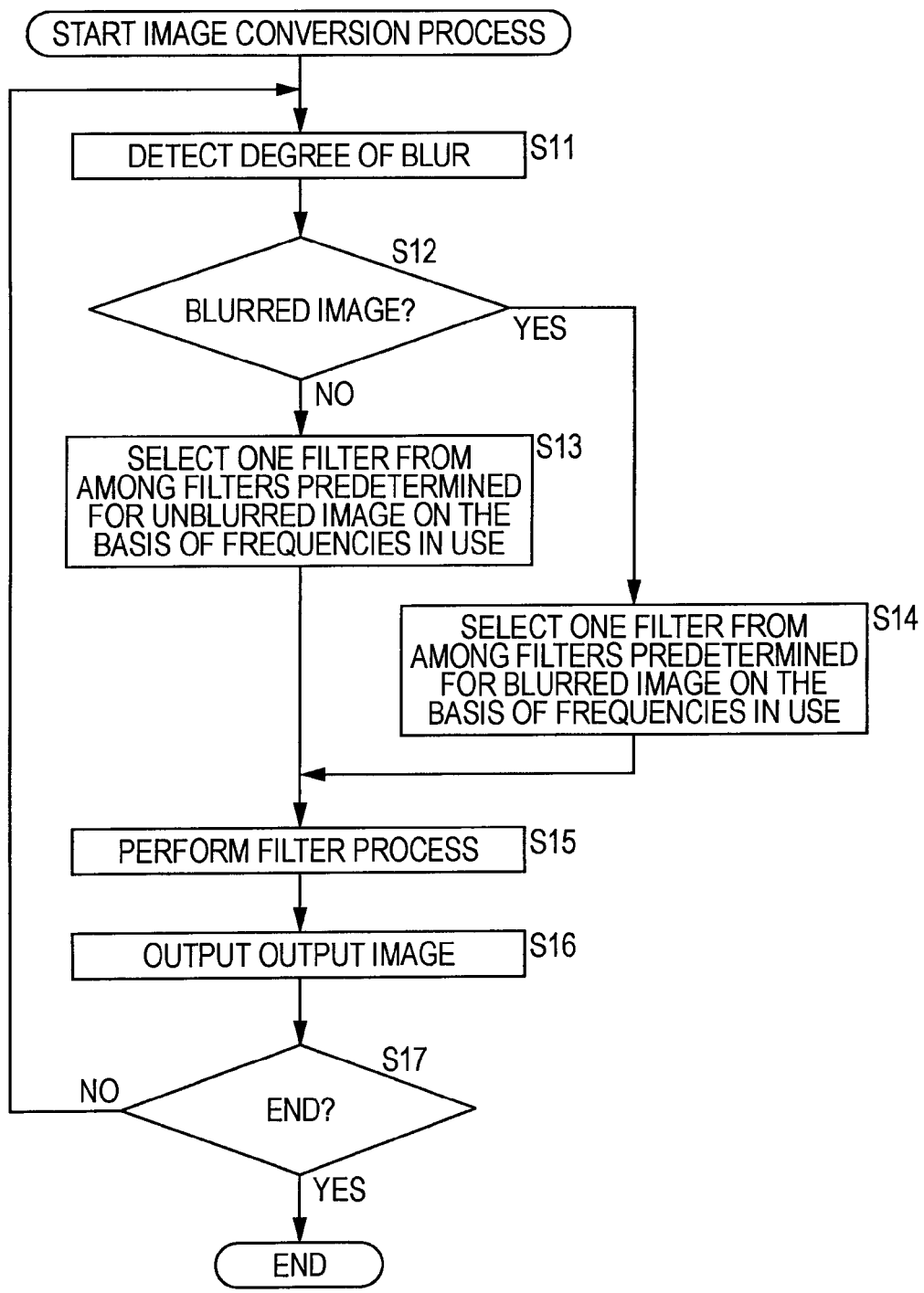
FIG. 6 is a flowchart illustrating an image conversion process.

Note that the process in step S41 is similar to the process in step S11 in FIG. 6 and thus the description thereof is omitted.

In step S42, the edge complexity detecting unit 61 performs an edge complexity detection process to calculate an edge complexity, and supplies it to the selecting unit 22. Also, in step S43, the size detecting unit 62 performs a size detection process to calculate a box size, and supplies it to the selecting unit 22.

In step S44, the color distribution complexity detecting unit 63 performs a color distribution complexity detection process to calculate a color distribution complexity, and supplies it to the selecting unit 22. Furthermore, in step S45, the color bias detecting unit 64 performs a color bias detection process to calculate the degree of color bias, and supplies it to the selecting unit 22.

Also, the details of the edge complexity detection process, size detection process, color distribution complexity detection process, and color bias detection process performed in steps S42 to S45, respectively, will be described below.

In this way, after the feature quantities have been calculated by the degree-of-blur detecting unit 21 and the edge complexity detecting unit 61 to the color bias detecting unit 64 and supplied to the selecting unit 22, the process proceeds to step S46.

In step S46, the selecting unit 22 performs a filter selection process to select a filter to be used for an image processing operation that is to be performed on the input image. Also, the details of the filter selection process will be described below. In the filter selection process, a filter is selected by using the feature quantities supplied to the selecting unit 22. After the filter has been selected, the input image is supplied to the block that holds the selected filter, that is, any of the comic-style conversion unit 23 to the painting-style conversion unit 27.

Then, after that, the processes in step S47 to step S49 are performed and the image conversion process ends. These processes are similar to the processes in step S15 to step S17 in FIG. 6, respectively, and thus the description thereof is omitted.

In this way, the image processing apparatus 51 calculates feature quantities of a plurality of features from an input image supplied thereto, and converts the input image into an output image by performing an appropriate image processing operation determined by the feature quantities. Accordingly, an output image can be generated by selecting an image processing operation that is more effective for the input image. As a result, the output image can be displayed more effectively.

Next, the edge complexity detection process corresponding to the process in step S42 in FIG. 14 will be described with reference to the flowchart in FIG. 15. This edge complexity detection process is performed by the edge complexity detecting unit 61 in FIG. 10.

In step S71, the filter processing unit 91 performs a filter process on an input image supplied thereto using a filter for extracting edges, such as a Laplacian filter, for example. That is, the filter processing unit 91 generates an R image, a G image, and a B image from the input image, performs a filter process on those R image, G image, and B image, and supplies them to the average value calculating unit 92.

In step S72, the average value calculating unit 92 calculates average values in respective pixels of the R image, G image, and B image supplied from the filter processing unit 91, thereby generating one image. That is, the pixel value of each pixel of the generated image is an average value of the pixels at the same position as the pixel of the R image, G image, and B image. The average value calculating unit 92 normalizes the image obtained by calculating the average values to make an image of a predetermined size, 100 pixels in the vertical direction and 100 pixels in the horizontal direction, for example, and supplies it to the distance calculating unit 93 and the distance calculating unit 94.

In step S73, the distance calculating unit 93 and the distance calculating unit 94 calculate the distance between the image supplied from the average value calculating unit 92 and a prepared simple image and the distance between the image supplied from the average value calculating unit 92 and a prepared complex image, respectively, and supply them to the score calculating unit 95.

For example, the distance between the image supplied from the average value calculating unit 92 and the simple image (or complex image) is regarded as a Euclidean distance between an image that is obtained by performing the filter process performed by the filter processing unit 91 and the process of calculating average values performed by the average value calculating unit 92 on the simple image and the image supplied from the average value calculating unit 92. Thus, the distance obtained in this manner indicates the degree of similarity in edge complexity between the input image and the simple image (or complex image).

In step S74, the score calculating unit 95 calculates the difference between the distance supplied from the distance calculating unit 93 and the distance supplied from the distance calculating unit 94, thereby calculating the score (value) of edge complexity, and supplies it to the selecting unit 22. The value of edge complexity obtained in this manner is larger as the distance between the input image and the complex image is shorter, in which edges in the input image are more complex.

After the edge complexity has been calculated and supplied to the selecting unit 22, the edge complexity detection process ends. After that, the process proceeds to step S43 in FIG. 14.

Figure 16:
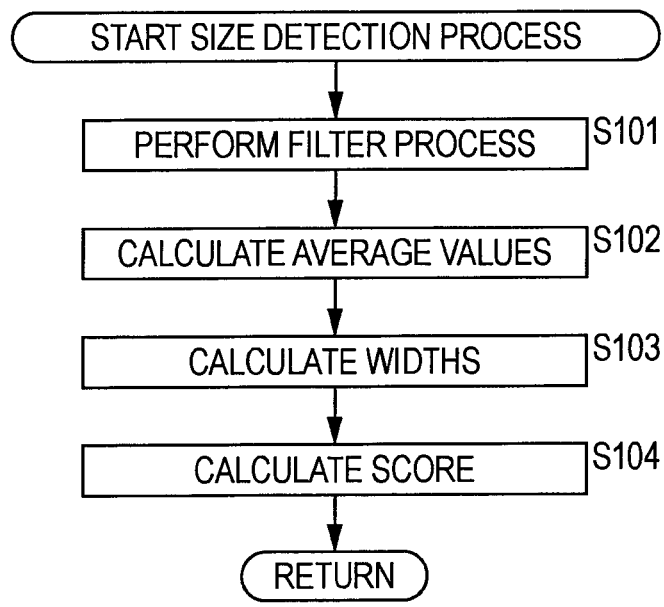
FIG. 16 is a flowchart illustrating a size detection process.

Also, hereinafter, the seize detection process corresponding to step S43 in FIG. 14 will be described with reference to the flowchart in FIG. 16. This size detection process is performed by the size detecting unit 62 in FIG. 11.

Figure 15:
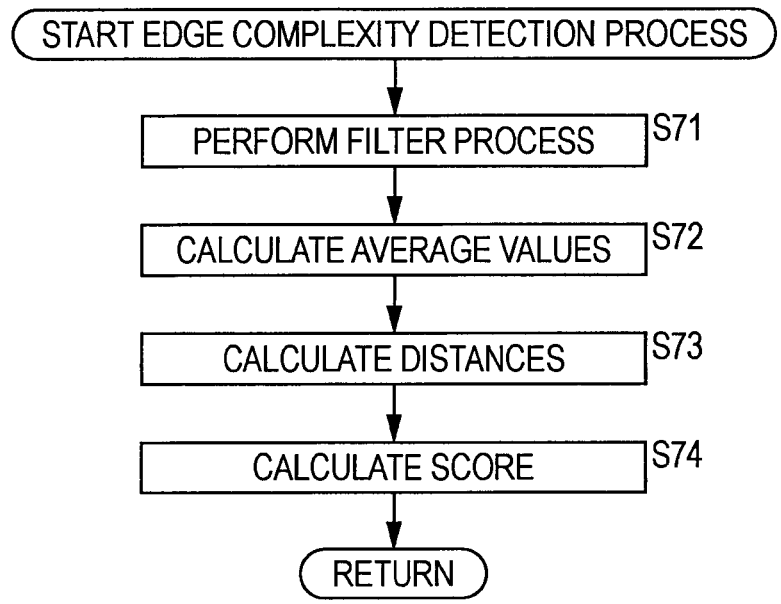
FIG. 15 is a flowchart illustrating an edge complexity detection process.

Note that the processes in step S101 and step S102 are similar to the processes in step S71 and step S72 in FIG. 15 and thus the description thereof is omitted. That is, a filter process is performed on an input image by the filter processing unit 121, average values in respective pixels of the R image, G image, and B image supplied from the filter processing unit 121 are calculated by the average value calculating unit 122, and the obtained image is normalized.

In step S103, the width calculating unit 123 and the width calculating unit 124 calculate the widths in the x direction and y direction of a bounding box in the input image by using the image supplied from the average value calculating unit 122, and supply them to the score calculating unit 125.

For example, the width calculating unit 123 regards lines made up of pixels arranged in the y direction in the image supplied from the average value calculating unit 122 as y lines, and calculates a y line value of each y line, the y line value being a total value of pixel values of pixels constituting the y line.

Then, the width calculating unit 123 calculates the width in the x direction of a region made up of the sequentially-arranged y lines, including 98% of the total quantity of edges included in the image, by using the y line values calculated for the respective y lines, the width in the x direction serving as a width Wx in the x direction of the bounding box. That is, the calculated total value of the y line values of the y lines included in the region is a value of 98% or more of the total value of the y line values of all the y lines constituting the image.

Likewise, the width calculating unit 124 regards lines made up of pixels arranged in the x direction in the image supplied from the average value calculating unit 122 as x lines, and calculates an x line value of each x line, the x line value being a total value of pixel values of pixels constituting the x line. Then, the width calculating unit 124 calculates the width in the y direction of a region made up of the sequentially-arranged x lines, including 98% of the total quantity of edges included in the image, by using the x line values calculated for the respective x lines, the width in the y direction serving as a width Wy in the y direction of the bounding box.

In step S104, the score calculating unit 125 calculates the score of a box size on the basis of the width Wx and the width Wy supplied from the width calculating unit 123 and the width calculating unit 124, and supplies it to the selecting unit 22. For example, the reciprocal of the value obtained by subtracting the product of the normalized width Wx and width Wy from 1 is regarded as the value (score) of the box size.

Specifically, in a case where the image obtained through calculation of average values by the average value calculating unit 122 is normalized into the size of 100 pixels in the x direction and 100 pixels in the y direction, the width Wx and the width Wy are normalized by being divided by 100. That is, the reciprocal of "1−(Wx/100)×(Wy/100)" is regarded as the value of the box size.

The value of the box size calculated in this manner is larger as the size of the bounding box is larger, which indicates that the degree of tightness of a region where edges concentrate in the input image is lower. After the calculated box size has been supplied to the selecting unit 22, the size detection process ends. After that, the process proceeds to step S44 in FIG. 14.

Figure 17:
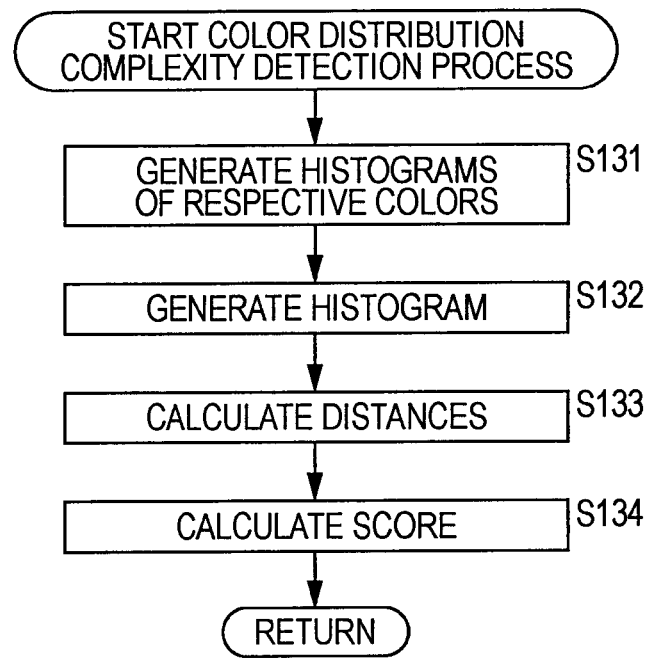
FIG. 17 is a flowchart illustrating a color distribution complexity detection process.

Next, the color distribution complexity detection process corresponding to the process in step S44 in FIG. 14 will be described with reference to the flowchart in FIG. 17. Note that this color distribution complexity detection process is performed by the color distribution complexity detecting unit 63 in FIG. 12.

In step S131, the each-color histogram generating unit 151 generates histograms of components of respective colors R, G, and B of an input image by using the input image supplied thereto, and supplies them to the histogram generating unit 152.

In step S132, the histogram generating unit 152 generates one histogram from the histograms of the respective colors supplied from the each-color histogram generating unit 151, and supplies it to the distance calculating unit 153 and the distance calculating unit 154. For example, the histogram generating unit 152 normalizes the histograms of the respective colors, and generates one histogram having bins the number of which is the cube of 16, each bin being a predetermined range of pixel values of the input image, from the normalized histograms of the respective colors.

In step S133, the distance calculating unit 153 and the distance calculating unit 154 calculate the distance between the histogram supplied from the histogram generating unit 152 and the histogram obtained from a prepared simple image and the distance between the histogram supplied from the histogram generating unit 152 and the histogram obtained from a prepared complex image, respectively, by using a K-NN method or the like. Here, each of the histograms obtained from the simple image and complex image is a histogram generated in the same process as that of the histogram generated by the histogram generating unit 152.

For example, the distance calculating unit 153 regards the total value of differences in frequency values of respective bins between the histogram supplied from the histogram generating unit 152 and the histogram of the simple image as the distance between those histograms. The distance calculating unit 153 calculates the distances to the histogram supplied from the histogram generating unit 152 for a plurality of simple images, and supplies them to the score calculating unit 155.

Likewise, the distance calculating unit 154 regards the total value of differences in frequency values of respective bins between the histogram supplied from the histogram generating unit 152 and the histogram of the complex image as the distance between those histograms. The distance calculating unit 154 calculates the distances to the histogram supplied from the histogram generating unit 152 for a plurality of complex images, and supplies them to the score calculating unit 155.

In step S134, the score calculating unit 155 calculates the score of color distribution complexity on the basis of the distances supplied from the distance calculating unit 153 and the distance calculating unit 154, and supplies it to the selecting unit 22.

For example, the score calculating unit 155 selects, from among the distances supplied from the distance calculating unit 153 and the distance calculating unit 154, distances the number of which is K in ascending order of the values of the distances. Then, the score calculating unit 155 calculates the difference between the number of distances to the histograms of the simple images and the number of distances to the histograms of the complex images among the K selected distances, and regards the calculated difference as the value (score) of color distribution complexity. That is, the difference between the number of differences supplied from the distance calculating unit 153 and the number of distances supplied from the distance calculating unit 154 among the K distances is regarded as a color distribution complexity.

The value of color distribution complexity calculated in this manner is larger as the complexity of color distribution in an input image is more approximate to the complexity of color distribution in a complex image, which indicates that the color distribution in the input image is more complex.

Figure 14:
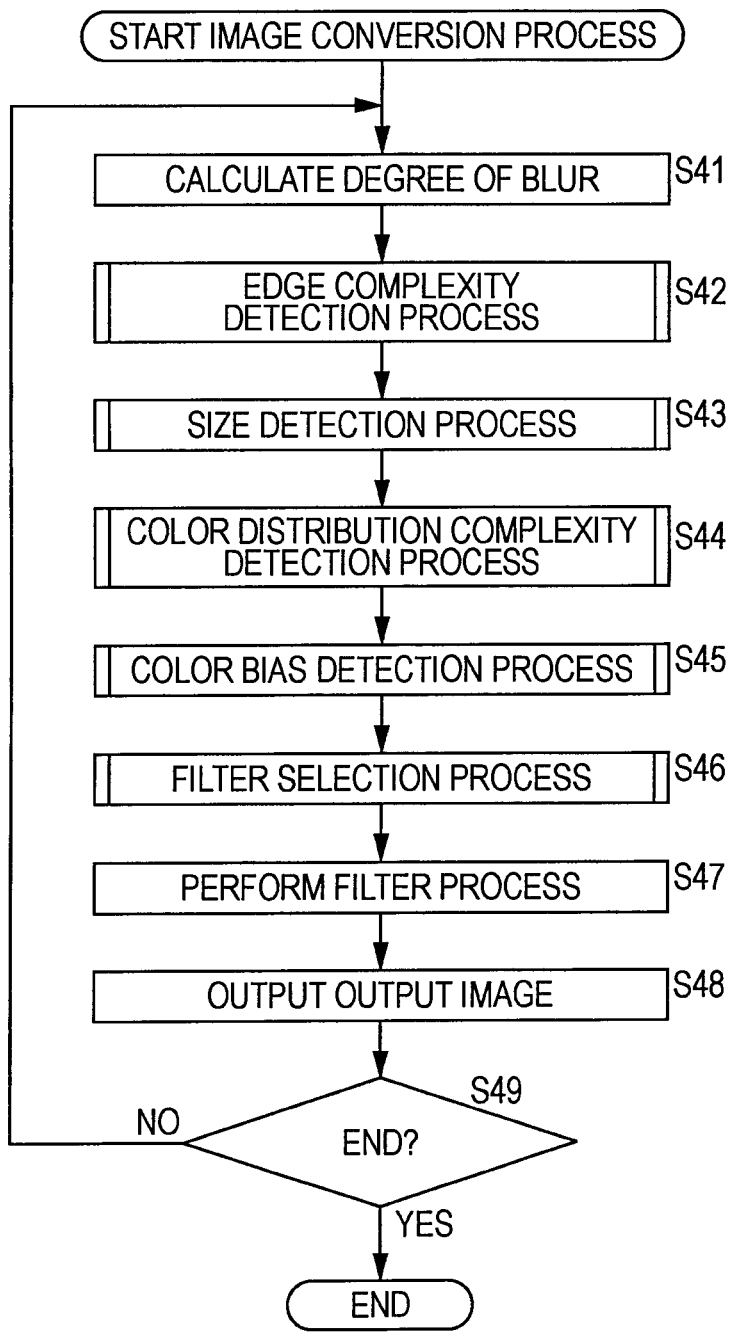
FIG. 14 is a flowchart illustrating an image conversion process.

After the color distribution complexity has been calculated and supplied to the selecting unit 22, the color distribution complexity detection process ends, and the process proceeds to step S45 in FIG. 14.

Figure 18:
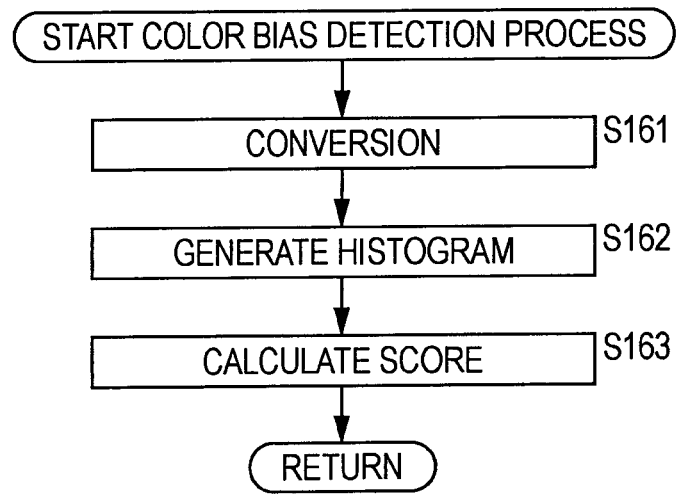
FIG. 18 is a flowchart illustrating a color bias detection process.

Next, the color bias detection process corresponding to the process in step S45 in FIG. 14 will be described with reference to the flowchart in FIG. 18. This color bias detection process is performed by the color bias detecting unit 64 in FIG. 13.

In step S161, the conversion unit 181 converts an input image supplied thereto into an image having pixel values of respective components of H, S, and V, and supplies it to the histogram generating unit 182.

In step S162, the histogram generating unit 182 generates a histogram of pixels satisfying a predetermined condition from the image supplied from the conversion unit 181, and supplies it to the score calculating unit 183. For example, the predetermined condition is that the value of the V component of a pixel is larger than 0.15 and is smaller than 0.95 and that the value of the S component of the pixel is larger than 0.2. The pixels satisfying the condition are extracted from the image supplied from the conversion unit 181. Then, a histogram is generated from the extracted pixels, the range of values of H components of the pixels being a bin in the histogram, and the histogram is supplied to the score calculating unit 183.

In step S163, the score calculating unit 183 calculates the score of the degree of color bias on the basis of the histogram supplied from the histogram generating unit 182, and supplies it to the selecting unit 22. For example, the score calculating unit 183 calculates a median N of a bin having the highest frequency value, having a value of 5% or more of the total value of the frequency values of individual bins of the histogram as a frequency value, and subtracts the median N from a predetermined value, for example 20. The value obtained thereby is regarded as the value (score) of the degree of color bias.

The value of the degree of color bias calculated in this manner is larger as the median N, that is, an H (hue) component, is low, which indicates that the degree of color bias is high in the input image. After the calculated degree of color bias has been supplied to the selecting unit 22, the color bias detection process ends, and the process proceeds to step S46 in FIG. 14.

Figure 19:
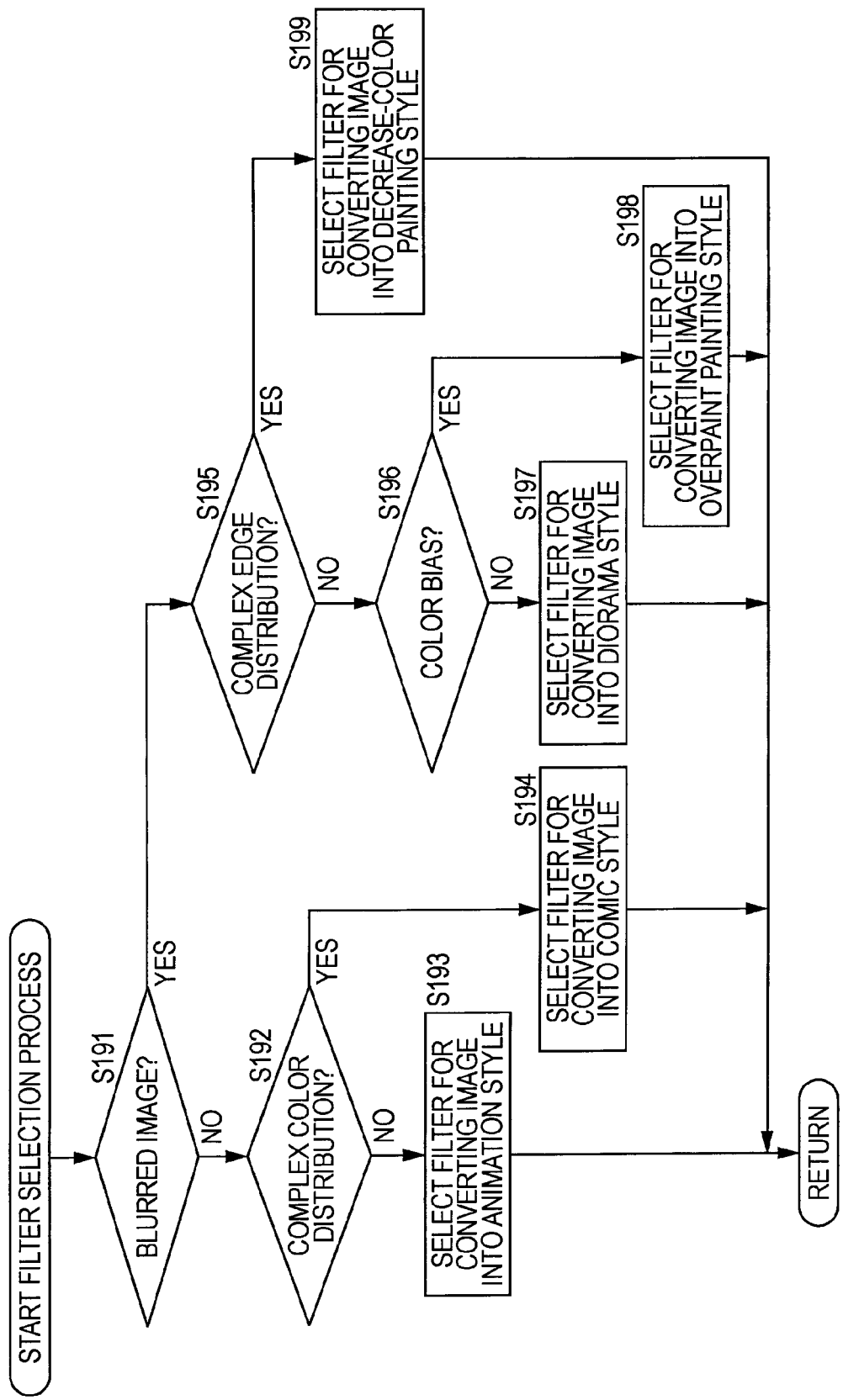
FIG. 19 is a flowchart illustrating a filter selection process.

Furthermore, the filter selection process corresponding to the process in step S46 in FIG. 14 will be described with reference to the flowchart in FIG. 19. This filter selection process is performed by the selecting unit 22 in FIG. 7.

In step S191, the selecting unit 22 determines whether the input image supplied thereto is a blurred image or not on the basis of the degree of blur supplied from the degree-of-blur detecting unit 21. For example, in a case where the degree of blur is equal to or higher than a predetermined threshold, the input image is determined to be a blurred image.

If it is determined in step S191 that the input image is not a blurred image, the selecting unit 22 determines in step S192 whether the color distribution of the input image is complex or not on the basis of the color distribution complexity supplied from the score calculating unit 155 of the color distribution complexity detecting unit 63. For example, in a case where the color distribution complexity is equal to or higher than the predetermined threshold, it is determined that the color distribution is complex.

In a case where it is determined in step S192 that the color distribution is not complex, the selecting unit 22 selects the filter for converting the input image into an animation-style image as a filter for the image processing operation to be performed on the input image in step S193.

That is, since the input image is not a blurred image and the color distribution is simple, the animation-style conversion process is selected as an image processing operation, as illustrated in FIG. 9. The selecting unit 22 supplies the input image supplied thereto to the animation-style conversion unit 24 that performs the animation-style conversion process, and the filter selection process ends. Then, after that, the process proceeds to step S47 in FIG. 14.

On the other hand, in a case where it is determined in step S192 that the color distribution is complex, the selecting unit 22 selects the filter for converting the input image into a comic-style image as a filter for the image processing operation to be performed on the input image in step S194.

That is, since the input image is not a blurred image and the color distribution thereof is complex, the comic-style conversion process is selected as an image processing operation, as illustrated in FIG. 9. The selecting unit 22 supplies the input image supplied thereto to the comic-style conversion unit 23 that performs the comic-style conversion process, and the filter selection process ends. Then, after that, the process proceeds to step S47 in FIG. 14.

Also, in a case where it is determined in step S191 that the input image is a blurred image, the selecting unit 22 determines in step S195 whether the edge distribution of the input image is complex or not on the basis of the edge complexity supplied from the score calculating unit 95 of the edge complexity detecting unit 61. For example, in a case where the edge complexity is equal to or higher than the predetermined threshold, the edge distribution is determined to be complex.

If it is determined in step S195 that the edge distribution is not complex, the selecting unit 22 determines in step S196 whether the input image has a color bias or not on the basis of the degree of color bias supplied from the score calculating unit 183 of the color bias detecting unit 64. For example, in a case where the degree of color bias is equal to or higher than the predetermined threshold, it is determined that the input image has a color bias.

In a case where it is determined in step S196 that the input image has no color bias, the selecting unit 22 selects the filter for converting the input image into a diorama-style image as a filter for the image processing operation to be performed on the input image in step S197.

That is, since the edge distribution of the input image is simple and there is no color bias, the diorama-style conversion process is selected as an image processing operation, as illustrated in FIG. 9. The selecting unit 22 supplies the input image supplied thereto to the diorama-style conversion unit 25 that performs the diorama-style conversion process, and the filter selection process ends. Then, after that, the process proceeds to step S47 in FIG. 14.

On the other hand, in a case where it is determined in step S196 that there is a color bias, the selecting unit 22 selects the filter for converting the input image into an overpaint painting-style image as a filter for the image processing operation to be performed on the input image in step S198.

That is, since the edge distribution of the input image is simple and there is a color bias, the overpaint painting-style conversion process is selected as an image processing operation, as illustrated in FIG. 9. The selecting unit 22 supplies the input image supplied thereto to the painting-style conversion unit 27 that performs the overpaint painting-style conversion process, and the filter selection process ends. Then, after that, the process proceeds to step S47 in FIG. 14.

Also, in a case where it is determined in step S195 that the edge distribution is complex, the selecting unit 22 selects the filter for converting the input image into a decrease-color painting-style image as a filter for the image processing operation to be performed on the input image in step S199.

That is, since the edge distribution of the input image is complex, the decrease-color painting-style conversion process is selected as an image processing operation, as illustrated in FIG. 9. The selecting unit 22 supplies the input image supplied thereto to the painting-style conversion unit 26 that performs the decrease-color painting-style conversion process, and the filter selection process ends. Then, after that, the process proceeds to step S47 in FIG. 14.

In this way, the selecting unit 22 selects an image processing operation that is more appropriate for the input image on the basis of the feature quantities extracted from the input image, and supplies the input image to the block that performs the image processing operation. In this way, by using feature quantities, an image processing operation that is more effective for the input image can be selected more easily.

<Third Embodiment>

[Configuration of Image Processing Apparatus]

Also, according to the above description, an image processing operation is performed on an entire input image. Alternatively, an image processing operation may be performed on only a region of the input image, or different image processing operations may be performed on a region and another region.

Figure 20:
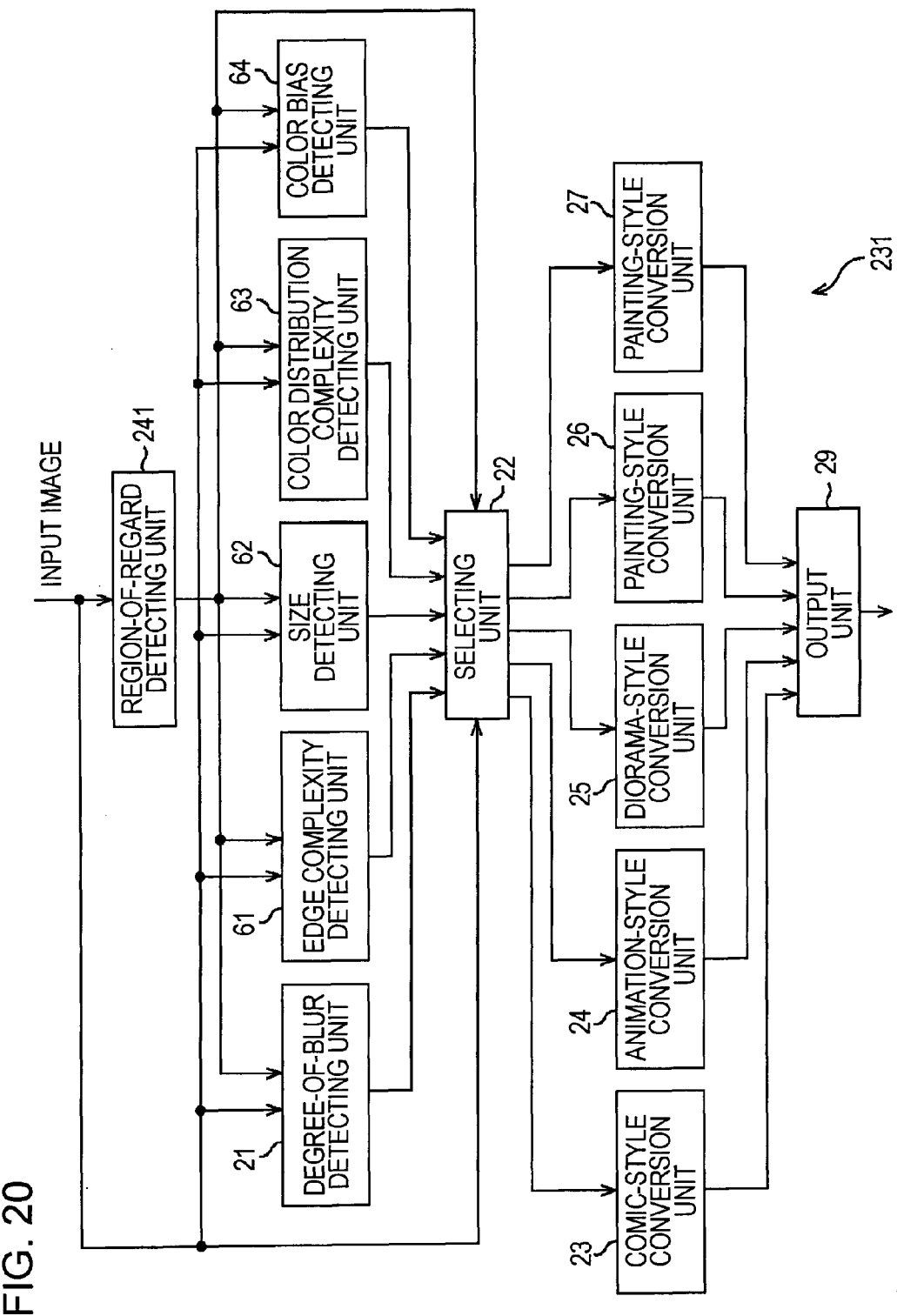
FIG. 20 is a diagram illustrating another configuration example of the image processing apparatus.

In such a case, the image processing apparatus has the configuration illustrated in FIG. 20, for example. Note that, in FIG. 20, the parts corresponding to those in FIG. 7 are denoted by the same reference numerals, and the description thereof is appropriately omitted.

The image processing apparatus 231 includes a region-of-regard detecting unit 241, the degree-of-blur detecting unit 21, the edge complexity detecting unit 61 to the color bias detecting unit 64, the selecting unit 22 to the painting-style conversion unit 27, and the output unit 29.

The region-of-regard detecting unit 241 extracts feature quantities of features of a region of a subject in an input image supplied thereto, thereby detecting the subject from the input image, and generates a subject map, which is information for specifying a region of regard including the subject in the input image. The, the region-of-regard detecting unit 241 supplies the generated subject map to the degree-of-blur detecting unit 21, the edge complexity detecting unit 61 to the color bias detecting unit 64, and the selecting unit 22.

Here, detection of a subject is performed under the assumption that an object in an input image that is estimated to be focused on by a user when the user glances at the input image, that is, an object that is estimated to be looked at by the user, is a subject. Thus, a subject is not necessarily limited to a person.

The degree-of-blur detecting unit 21 and the edge complexity detecting unit 61 to the color bias detecting unit 64 extract feature quantities from a region of regard in an input image supplied thereto and a background region, which is a region other than the region of regard, by using the subject map supplied from the region-of-regard detecting unit 241, and supplies them to the selecting unit 22. That is, the degree of blur, edge complexity, box size, color distribution complexity, and degree of color bias in each of the region of regard and the background region are calculated.

The selecting unit 22 selects an image processing operation to be performed on at least one of the region of regard and the background region on the basis of the feature quantities supplied from the degree-of-blur detecting unit 21 and the edge complexity detecting unit 61 to the color bias detecting unit 64. Additionally, in a case where image processing operations are to be performed on both regions, the image processing operations are selected for the respective regions.

Also, the selecting unit 22 supplies the input image supplied thereto and the subject map supplied from the region-of-regard detecting unit 241 to the block that performs the selected image processing operation. The output unit 29 combines output images supplied from the comic-style conversion unit 23 to the painting-style conversion unit 27, that is, the image in the region of regard and the image in the background region as necessary, thereby outputting a finally-obtained output image.

Figure 21:
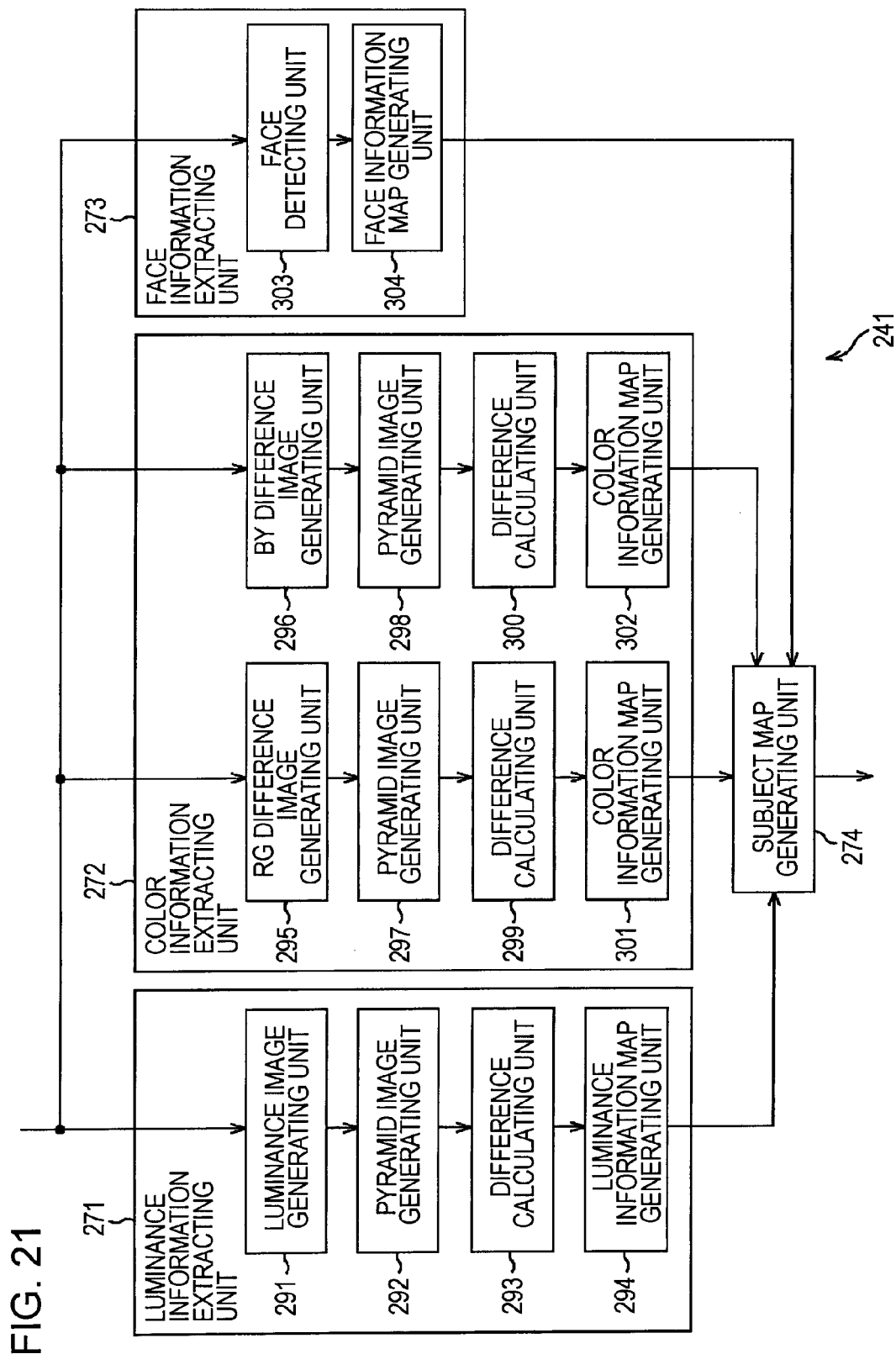
FIG. 21 is a diagram illustrating a configuration example of a region-of-regard detecting unit.

Furthermore, the region-of-regard detecting unit 241 has the configuration illustrated in FIG. 21, for example.

That is, the region-of-regard detecting unit 241 includes a luminance information extracting unit 271, a color information extracting unit 272, a face information extracting unit 273, and a subject map generating unit 274.

The luminance information extracting unit 271 generates a luminance information map indicating information about luminance in each region of an input image supplied thereto on the basis of the input image, and supplies it to the subject map generating unit 274.

The luminance information extracting unit 271 includes a luminance image generating unit 291, a pyramid image generating unit 292, a difference calculating unit 293, and a luminance information map generating unit 294.

The luminance image generating unit 291 generates a luminance image by using an input image supplied thereto, the luminance values of pixels of the input image serving as pixel values of the pixels in the luminance image, and supplies it to the pyramid image generating unit 292. Here, the pixel value of an arbitrary pixel of the luminance image indicates the luminance value of the pixel at the same position as the arbitrary pixel in the input image.

The pyramid image generating unit 292 generates a plurality of luminance images having resolutions different from each other by using the luminance image supplied from the luminance image generating unit 291, and supplies those luminance images as pyramid images of luminance to the difference calculating unit 293.

For example, pyramid images in eight layers of resolution from level L1 to level L8 are generated. The pyramid image of level L1 has the highest resolution, and the resolution of the pyramid images decreases in order from level L1 to level L8.

In this case, the luminance image generated by the luminance image generating unit 291 is regarded as the pyramid image of level L1. Also, an average value of pixel values of four pixels adjoining to each other in the pyramid image of level L1 (note that $1 \leq i \leq 7$) is regarded as the pixel value of one pixel in the pyramid image of level L (i+1) corresponding to those pixels. Thus, the pyramid image of level L (i+1) is a horizontally and vertically half image with respect to the pyramid image of level Li.

The difference calculating unit 293 selects two pyramid images in different layers from among the plurality of pyramid images supplied from the pyramid image generating unit 292, and calculates the difference between the selected pyramid images to generate a difference image of luminance. Additionally, the pyramid images in the respective layers have different sizes (number of pixels), and thus a smaller pyramid image is up-converted in accordance with a larger pyramid image at the generation of a difference image.

After generating a predetermined number of difference images of luminance, the difference calculating unit 293 normalizes those generated difference images and supplies them to the luminance information map generating unit 294. The luminance information map generating unit 294 generates a luminance information map on the basis of the difference images supplied from the difference calculating unit 293 and supplies it to the subject map generating unit 274.

In addition, the color information extracting unit 272 generates a color information map indicating information about colors in individual regions of an input image supplied thereto on the basis of the input image, and supplies it to the subject map generating unit 274.

The color information extracting unit 272 includes an RG difference image generating unit 295, a BY difference image generating unit 296, a pyramid image generating unit 297, a pyramid image generating unit 298, a difference calculating unit 299, a difference calculating unit 300, a color information map generating unit 301, and a color information map generating unit 302.

The RG difference image generating unit 295 generates an RG difference image by using an input image supplied thereto, the difference between an R (red) component and a G (green) component of each pixel of the input image being the pixel value of the pixel in the RG difference image, and supplies it to the pyramid image generating unit 297. The pixel value of an arbitrary pixel of the RG difference image indicates the value of the difference between the R component and the G component of the pixel of the input image at the same position as the arbitrary pixel.

The BY difference image generating unit 296 generates a BY difference image by using an input image supplied thereto, the difference between a B (blue) component and a Y (yellow) component of each pixel of the input image being the pixel value of the pixel in the BY difference image, and supplies it to the pyramid image generating unit 298. The pixel value of an arbitrary pixel of the BY difference image indicates the value of the difference between the B (blue) component and the Y (yellow) component of the pixel of the input image at the same position as the arbitrary pixel. Additionally, the value of the Y (yellow) component of the input image is calculated from the values (pixel values) of components of respective colors R, G, and B of the input image.

The pyramid image generating unit 297 and the pyramid image generating unit 298 generate a plurality of RG difference images and BY difference images having resolutions different from each other by using the RG difference image and the BY difference image supplied from the RG difference image generating unit 295 and the BY difference image generating unit 296. Then, the pyramid image generating unit 297 and the pyramid image generating unit 298 supply those generated RG difference images and BY difference images, serving as pyramid images of RG difference and pyramid images of BY difference, to the difference calculating unit 299 and the difference calculating unit 300.

For example, as in the case of pyramid images of luminance, pyramid images in eight layers of resolution from level L1 to level L8 are generated as the pyramid images of RG difference and as the pyramid images of BY difference.

The difference calculating unit 299 and the difference calculating unit 300 select two pyramid images in layers different from each other from among the plurality of pyramid images supplied from the pyramid image generating unit 297 and the pyramid image generating unit 298, and calculate the difference between the selected pyramid images, thereby generating a difference image of RG difference and a difference image of BY difference. Additionally, the pyramid images in the respective layers have different sizes, and thus the smaller pyramid image is up-converted into the same size as the larger pyramid image at the generation of a difference image.

After generating a predetermined number of difference images of RG difference and difference images of BY difference, the difference calculating unit 299 and the difference calculating unit 300 normalize those generated difference images and supply them to the color information map generating unit 301 and the color information map generating unit 302. The color information map generating unit 301 and the color information map generating unit 302 generate color information maps on the basis of the difference images supplied from the difference calculating unit 299 and the difference calculating unit 300, and supply them to the subject map generating unit 274. The color information map generating unit 301 generates a color information map of RG difference, and the color information map generating unit 302 generates a color information map of BY difference.

The face information extracting unit 273 generates a face information map indicating information about a face of a person as a subject in individual regions of an input image supplied thereto on the basis of the input image, and supplies it to the subject map generating unit 274. The face information extracting unit 273 includes a face detecting unit 303 and a face information map generating unit 304.

The face detecting unit 303 detects a region of a face of a person as a subject from an input image supplied thereto, and supplies a detection result to the face information map generating unit 304. The face information map generating unit 304 generates a face information map on the basis of the detection result supplied from the face detecting unit 303 and supplies it to the subject map generating unit 274.

Additionally, hereinafter, in a case where the luminance information map to the face information map output from the luminance information extracting unit 271 to the face information extracting unit 273 are not required to be distinguished from each other, those maps are simply referred to as information maps. The information included in those information maps is information indicating feature quantities of features that are larger in a region including a subject. The information arranged in accordance with individual regions of an input image forms an information map. That is, the information map is information indicating the feature quantities in individual regions of an input image.

Therefore, a region with a larger information quantity in each information map, that is, a region of an input image corresponding to a region with a large feature quantity, is a region where it is highly possible that a subject is included, so that a region including a subject in an input image can be specified by using each information map.

The subject map generating unit 274 generates a subject map by linearly coupling the luminance information map, the color information maps, and the face information map supplied from the luminance information map generating unit 294, the color information map generating unit 301, the color information map generating unit 302, and the face information map generating unit 304. That is, the information (feature quantities) in individual regions of the luminance information map to the face information map is added with weighting in units of regions at the same position, whereby a subject map is generated. The subject map generating unit 274 supplies the generated subject map to the degree-of-blur detecting unit 21, the edge complexity detecting unit 61 to the color bias detecting unit 64, and the selecting unit 22.

[Description about Operation of Image Processing Apparatus]

Figure 22:
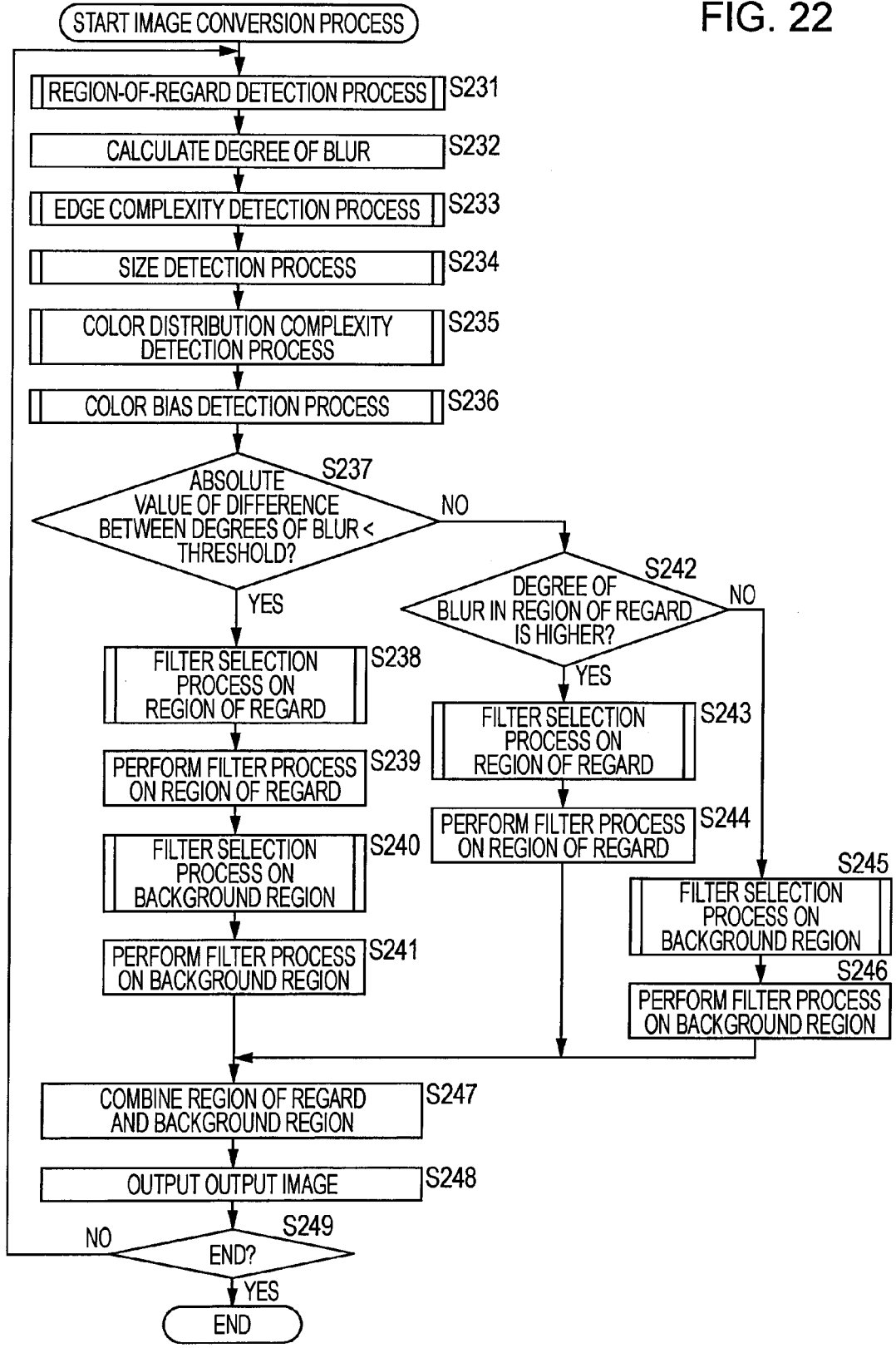
FIG. 22 is a flowchart illustrating an image conversion process.

Next, an image conversion process performed by the image processing unit 231 in FIG. 20 will be described with reference to the flowchart in FIG. 22.

In step S231, the region-of-regard detecting unit 241 performs a region-of-regard detection process to detect a region of regard from an input image. That is, the region-of-regard detecting unit 241 generates a subject map from the input image, and supplies it to the degree-of-blur detecting unit 21, the edge complexity detecting unit 61 to the color bias detecting unit 64, and the selecting unit 22. Additionally, the details of the region-of-regard detection process will be described below.

Also, after the region-of-regard detection process has been performed, then the processes in step S232 to step S236 are performed. These processes are similar to the processes in step S41 to step S45 in FIG. 14, and thus the description thereof is omitted.

That is, feature quantities of respective features are calculated in the degree-of-blur detecting unit 21 and the edge complexity detecting unit 61 to the color bias detecting unit 64 and are supplied to the selecting unit 22. Additionally, in the processes in step S232 to step S236, feature quantities in each of the region of regard and the background region of an input image are calculated on the basis of the subject map generated by the region-of-regard detecting unit 241. That is, the degree of blur, edge complexity, box size, color distribution complexity, and degree of color bias in the region of regard are calculated. Also, the degree of blur, edge complexity, box size, color distribution complexity, and degree of color bias in the background region are calculated.

In step S237, the selecting unit 22 determines, on the basis of the degrees of blur in the region of regard and the background region supplied from the degree-of-blur detecting unit 21, whether the absolute value of the difference between those degrees of blur is smaller than a predetermined threshold or not.

In a case where it is determined in step S237 that the absolute value is smaller than the threshold, the selecting unit 22 performs a filter selection process on the region of regard so as to select a filter to be used for the image processing operation to be performed on the region of regard of the input image in step S238.

Additionally, the filter selection process performed on this region of regard is similar to the filter selection process described with reference to FIG. 19, and thus the description thereof is omitted. Note that, in the filter selection process performed on the region of regard, an image processing operation to be performed on the region of regard is selected by using the degree of blur, edge complexity, box size, color distribution complexity, and degree of color bias in the region of regard.

After selecting the filter for the region of regard, that is, an image processing operation, the selecting unit 22 supplies the input image supplied thereto and the subject map supplied from the region-of-regard detecting unit 241 to the block that performs the selected image processing operation, and instructs the block to perform the image processing operation on the region of regard of the input image.

In step S239, the block supplied with the input image and the subject map from the selecting unit 22 among the comic-style conversion unit 23 to the painting-style conversion unit 27 performs a filter process on the region of regard of the input image by using the subject map supplied thereto.

For example, in a case where the decrease-color painting-style conversion process is selected by the selecting unit 22, the painting-style conversion unit 26 performs a decrease-color painting-style conversion process on the region of regard of the input image by using the subject map, thereby generating an output image of the part of the region of regard in the input image. The painting-style conversion unit 26 supplies the generated output image of the part of the region of regard to the output unit 29.

In step S240, the selecting unit 22 performs a filter selection process on the background region so as to select a filter to be used for the image processing operation to be performed on the background region of the input image.

Additionally, the filter selection process performed on the background region is similar to the filter selection process described with reference to FIG. 19, and thus the description thereof is omitted. Note that, in the filter selection process performed on the background region, an image processing operation to be performed on the background region is selected by using the degree of blur, edge complexity, box size, color distribution complexity, and degree of color bias in the background region.

After selecting the filter for the background region, that is, an image processing operation, the selecting unit 22 supplies the input image supplied thereto and the subject map supplied from the region-of-regard detecting unit 241 to the block that performs the selected image processing operation, and instructs the block to perform the image processing operation on the background region of the input image.

In step S241, the block supplied with the input image and the subject map from the selecting unit 22 among the comic-style conversion unit 23 to the painting-style conversion unit 27 performs a filter process on the background region of the input image by using the subject map supplied thereto.

For example, in a case where the animation-style conversion process is selected by the selecting unit 22, the animation-style conversion unit 24 performs an animation-style conversion process on the background region of the input image by using the subject map, thereby generating an output image of the part of the background region in the input image. The animation-style conversion unit 24 supplies the generated output image of the part of the background region to the output unit 29.

After the output image of the part of the background region has been supplied to the output unit 29, then the process proceeds to step S247.

Also, in a case where it is determined in step S237 that the absolute value of the difference between the degrees of blur is not smaller than the threshold, the selecting unit 22 determines whether the degree of blur in the region of regard is higher than the degree of blur in the background region in step S242.

In a case where it is determined in step S242 that the degree of blur in the region of regard is higher, the selecting unit 22 performs a filter selection process on the region of regard to select a filter in step S243. Additionally, the process in step S243 is similar to the process in step S238, and thus the description thereof is omitted.

After selecting the filter, that is, an image processing operation, the selecting unit 22 supplies the subject map supplied from the region-of-regard detecting unit 241 and the input image supplied thereto to the block that performs the image processing operation, and instructs the block to perform the image processing operation on the region of regard of the input image.

In step S244, the block supplied with the input image and the subject map from the selecting unit 22 among the comic-style conversion unit 23 to the painting-style conversion unit 27 performs a filter process on the region of regard of the input image by using the subject map supplied thereto. Then, the image of the part of the region of regard obtained through the filter process is regarded as an output image of the part of the region of regard.

Also, the block that performs the image processing operation extracts the background region of the input image by using the subject map and regards the background region itself as an output image of the part of the background region. The block that performs the image processing operation supplies the output image of the part of the region of regard obtained through the filter process and the output image of the part of the background region to the output unit 29.

After the output image of the part of the region of regard and the output image of the part of the background region have been supplied to the output unit 29, then the process proceeds to step S247. In such a case where the degree of blur in the region of regard is much higher than that in the background region, an image processing operation is performed on the region of regard of the input image, whereas no image processing operation is performed on the unblurred background region, which is left as is.

Also, in a case where it is determined in step S242 that the degree of blur in the region of regard is not higher, that is, in a case where the degree of blur in the background region is higher than the degree of blur in the region of regard, the selecting unit 22 performs a filter selection process on the background region to select a filter in step S245. Additionally, the process in step S245 is similar to the process in step S240, and thus the description thereof is omitted.

After selecting the filter, that is, an image processing operation, the selecting unit 22 supplies the subject map supplied from the region-of-regard detecting unit 241 and the input image supplied thereto to the block that performs the image processing operation, and instructs the block to perform the image processing operation on the background region of the input image.

In step S246, the block supplied with the input image and the subject map from the selecting unit 22 among the comic-style conversion unit 23 to the painting-style conversion unit 27 performs a filter process on the background region of the input image by using the subject map supplied thereto. Then, the image of the part of the background region obtained through the filter process is regarded as an output image of the part of the background region.

Also, the block that performs the image processing operation extracts the region of regard of the input image by using the subject map and regards the region of regard itself as an output image of the part of the region of regard. The block that performs the image processing operation supplies the output image of the part of the background region obtained through the filter process and the output image of the part of the region of regard to the output unit 29.

After the output image of the part of the region of regard and the output image of the part of the background region have been supplied to the output unit 29, then the process proceeds to step S247. In such a case where the degree of blur in the background region is much higher than that in the region of regard, an image processing operation is performed on the background region of the input image, whereas no image processing operation is performed on the unblurred region of regard, which is left as is.

After the process in step S241, step S244, or step S246 has been performed and the output image of the part of the region of regard and the output image of the part of the background region have been supplied to the output unit 29, the output unit 29 combines the output image of the part of the region of regard and the output image of the part of the background region supplied thereto, thereby generating one final output image in step S247.

The output image obtained in this manner is an image in which image processing operations that are individually selected have been performed on the region of regard and the background region, or an image in which an image processing operation has been performed on any one of the region of regard and the background region. In this way, after the final output image has been obtained, then the processes in step S248 and step S249 are performed and the image conversion process ends. Those processes are similar to the processes in step S16 and step S17 in FIG. 6, and thus the description thereof is omitted.

In this way, the image processing apparatus 231 performs an image processing operation on at least one of the region of regard and the background region of an input image, so as to convert the input image into an output image. Accordingly, a more effective image processing operation can be easily selected for each region of an input image so as to generate an output image. As a result, the output image can be displayed more effectively.

For example, in a case where only the background region of an input image is blurred, the region of regard is left as is, and an image processing operation is performed on the background region, whereby a subject in the region of regard can be put in space different from that of the scene at capturing of the input image. Therefore, a high impact can be given to a user during appreciation of an output image, so that the user can be caused to enjoy the appreciation of the output image more.

Also, in a case where the degrees of blur in the region of regard and the background region of the input image are almost the same, image processing operations that are individually selected are performed on both the regions, whereby an output image in which individual regions have different textures can be displayed and the user can be caused to enjoy the appreciation of the output image more.

Additionally, in the case of performing an image processing operation on the region of regard or the background region, face detection in the input image may be preferentially performed, for example. When a face of a person is included in the region of regard, the region of the face of the person in the region of regard may be left as is, and an image processing operation may be performed on a region where a face of a person does not exist. For example, detection of a region of a face of a person can be specified by using the face information map generated in the region-of-regard detecting unit 241.

Also, in the case of selecting an image processing operation to be performed on the region of regard or the background region, some output images on which different image processing operations have been performed may be generated with respect to those regions, and an image processing operation to be performed on each region may be selected from among the generated output images. In this case, like Seam Carving, for example, the coupling of the boundary line between the output image of the part of the region of regard and the output image of the part of the background region is evaluated as energy. On the basis of the evaluation, an image processing operation is selected in which the output images of those regions are coupled more smoothly at combining.

Furthermore, the subject map may be used as a mask. For example, in the case of performing an image processing operation on only the region of regard of an input image, the image processing operation is performed on only the region of regard of the input image by using the subject map as a mask, and the image obtained thereby is regarded as an output image. Accordingly, it is unnecessary to combine the output image of the part of the region of regard and the output image of the part of the background region in the output unit 29, so that an output image can be obtained more quickly.

Figure 23:
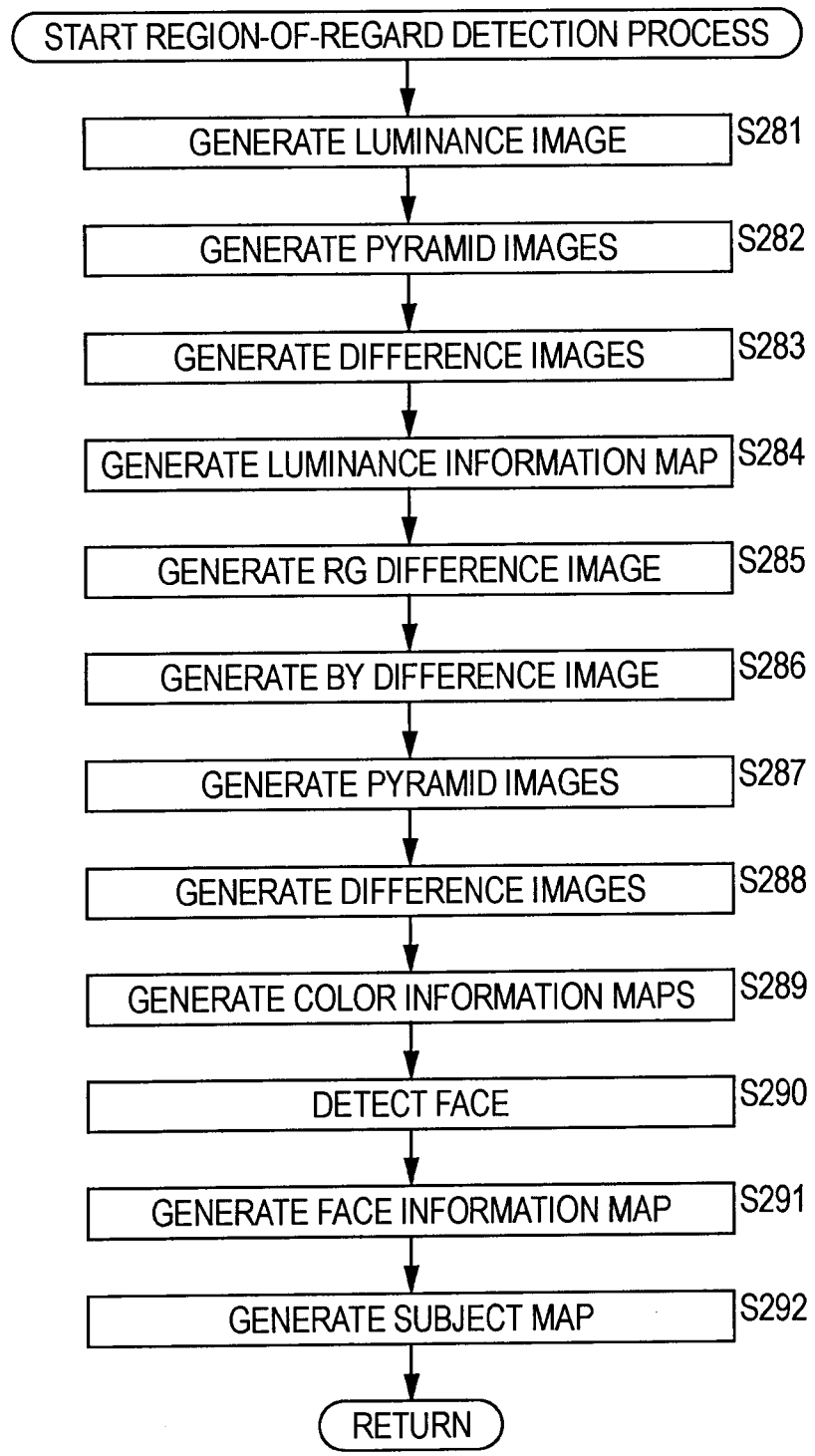
FIG. 23 is a flowchart illustrating a region-of-regard detection process.

Next, the region-of-regard detection process corresponding to the process in step S231 in FIG. 22 will be described with reference to the flowchart in FIG. 23.

In step S281, the luminance image generating unit 291 generates a luminance image by using an input image supplied thereto, and supplies it to the pyramid image generating unit 292. For example, the luminance image generating unit 291 multiplies the values of respective components of R, G, and B of each pixel of the input image by coefficients predetermined for the respective components, and the sum of the values of the respective components multiplied by the coefficients is regarded as the pixel value of the pixel of the luminance image at the same position as the pixel of the input image. That is, a luminance component of a component signal composed of a luminance component (Y) and a color-difference component (Cb, Cr) is obtained. Alternatively, the average value of the values of the respective components of R, G, and B of the pixel may be regarded as the pixel value of the pixel of the luminance image.

In step S282, the pyramid image generating unit 292 generates pyramid images in respective layers of level L1 to level L8 on the basis of the luminance image supplied from the luminance image generating unit 291, and supplies them to the difference calculating unit 293.

In step S283, the difference calculating unit 293 generates difference images by using the pyramid images supplied from the pyramid image generating unit 292, normalizes them, and supplies them to the luminance information map generating unit 294. The normalization is performed so that the pixel values of pixels of the difference images are values in the range from 0 to 255, for example.

Specifically, the difference calculating unit 293 calculates the differences between pyramid images in combinations of the layers of level L6 and level L3, level L7 and level L3, level L7 and level L4, level L8 and level L4, and level L8 and level L5, among the pyramid images of luminance in the respective layers. Accordingly, five difference images of luminance can be obtained in total.

For example, in a case where a difference image of a combination of level L6 and level L3 is generated, the pyramid image of level L6 is up-converted in accordance with the size of the pyramid image of level L3. That is, the pixel value of one pixel of the pyramid image of level L6 before up-converting corresponds to the pixel values of some pixels adjoining with each other corresponding to the one pixel of the pyramid image of level L6 after up-converting. Then, the differences between the pixel values of the pixels of the pyramid image of level L6 and the pixel values of the pixels at the same positions as the pixels of the pyramid image of level 3 are calculated, and the differences are regarded as the pixel values of the pixels of the difference image.

A process of generating those difference images is equivalent to extracting a predetermined frequency component from a luminance image by performing a filter process on the luminance image by using a band-pass filter. The pixel values of the pixels of the difference image obtained in this manner indicate the difference in luminance value of the pyramid images of respective levels, that is, the difference between the luminance in a predetermined pixel in an input image and an average luminance of pixels around the pixel.

Generally, a region having a large difference in luminance from the surroundings in an image is a region that draws the attention of a person who looks at the image, and thus it is highly possible that the region is a region of a subject. Thus, in each difference image, a pixel having a larger pixel value corresponds to a region that is highly possible to be a region of a subject.

In step S284, the luminance information map generating unit 294 generates a luminance information map on the basis of the difference images supplied from the difference calculating unit 293 and supplies it to the subject map generating unit 274.

For example, the luminance information map generating unit 294 performs weighting addition on the five difference images supplied thereto by using pre-calculated weights of the respective difference images, thereby obtaining one image. That is, each of the pixel values of the pixels at the same position of the individual difference images is multiplied by a weight, and the total sum of the pixel values multiplied by the weight is calculated.

Additionally, during generation of the luminance information map, up-converting of difference images is performed so that the individual images have the same size. According to the luminance information map obtained in this manner, a region having a large difference in luminance in an input image, that is, a region that is likely to attract the attention of an observer who glances at the input image, can be easily detected.

In step S285, the RG difference image generating unit 295 generates an RG difference image by using the input image supplied thereto, and supplies it to the pyramid image generating unit 297.

In step S286, the BY difference image generating unit 296 generates a BY difference image by using the input image supplied thereto, and supplies it to the pyramid image generating unit 298.

In step S287, the pyramid image generating unit 297 and the pyramid image generating unit 298 generate pyramid images by using the RG difference image supplied from the RG difference image generating unit 295 and the BY difference image supplied from the BY difference image generating unit 296.

For example, the pyramid image generating unit 297 generates a plurality of RG difference images having different resolutions, thereby generating, pyramid images in respective layers of level L1 to level L8, and supplies them to the difference calculating unit 299. Likewise, the pyramid image generating unit 298 generates a plurality of BY difference images having different resolutions, thereby generating pyramid images in respective layers of level L1 to level L8, and supplies them to the difference calculating unit 300.

In step S288, the difference calculating unit 299 and the difference calculating unit 300 generate difference images on the basis of the pyramid images supplied from the pyramid image generating unit 297 and the pyramid image generating unit 298 and normalize them, and supply them to the color information map generating unit 301 and the color information map generating unit 302. The normalization of the difference images is performed so that the pixel values of the pixels are values in the range from 0 to 255, for example.

For example, the difference calculating unit 299 calculates the differences between pyramid images in combinations of the layers of level L6 and level L3, level L7 and level L3, level L7 and level L4, level L8 and level L4, and level L8 and level L5, among the pyramid images of RG difference in the respective layers. Accordingly, five difference images of RG difference can be obtained in total.

Likewise, the difference calculating unit 300 calculates the differences between pyramid images in combinations of the layers of level L6 and level L3, level L7 and level L3, level L7 and level L4, level L8 and level L4, and level L8 and level L5, among the pyramid images of BY difference in the respective layers. Accordingly, five difference images of BY difference can be obtained in total.

A process of generating those difference images is equivalent to extracting a predetermined frequency component from an RG difference image or a BY difference image by performing a filter process on the RG difference image or BY difference image by using a band-pass filter. The pixel values of the pixels of the difference images obtained in this manner indicate the difference in specific color component of the pyramid images of respective levels, that is, the difference between a specific color component in a pixel in an input image and an average specific color component of pixels around the pixel.

Generally, a region of a prominent color compared to the surroundings in an image, that is, a region having a large difference in specific color component from the surroundings, is a region that draws the attention of a person who looks at the image, and thus it is highly possible that the region is a region of a subject. Thus, in each difference image, a pixel having a larger pixel value corresponds to a region that is highly possible to be a region of a subject.

In step S289, the color information map generating unit 301 and the color information map generating unit 302 generate color information maps by using the difference images supplied from the difference calculating unit 299 and the difference images supplied from the difference calculating unit 300, and supply them to the subject map generating unit 274.

For example, the color information map generating unit 301 performs weighting addition on the difference images of RG difference supplied from the difference calculating unit 299 using pre-calculated weights of the respective difference images, thereby obtaining one color information map of RG difference.

Likewise, the color information map generating unit 302 performs weighting addition on the difference images of BY difference supplied from the difference calculating unit 300 using pre-calculated weights, thereby obtaining one color information map of BY difference. Additionally, during generation of the color information map, up-converting of difference images is performed so that the individual difference images have the same size.

According to the color information maps obtained in this manner, a region having a large difference in specific color component in an input image, that is, a region that is likely to attract the attention of an observer who glances at the input image, can be easily detected.

In step S290, the face detecting unit 303 detects a region of a face of a person from the input image supplied thereto and supplies a detection result to the face information map generating unit 304. For example, the face detecting unit 303 performs a filter process on the input image by using a Gabor filter and extracts feature regions of eyes, mouth, nose, etc. from the input image, thereby detecting a region of a face in the input image.

In step S291, the face information map generating unit 304 generates a face information map by using a detection result supplied from the face detecting unit 303, and supplies it to the subject map generating unit 274.

For example, assume that a plurality of rectangular regions estimated to include a face in an input image (hereinafter referred to as candidate regions) are detected as a detection result of a face from the input image. Here, assume that a plurality of candidate regions are detected near a predetermined position of the input image and that those candidate regions partly overlap each other. That is, for example, in a case where a plurality of regions including one face are obtained as candidate regions with respect to a region of the one face in the input image, those candidate regions partly overlap each other.

The face information map generating unit 304 generates a detection image having the same size as the input image for each of the candidate regions obtained through detection of the face. In this detection image, the pixel value of a pixel in the same region as the candidate region to be processed in the detection image is larger than the pixel value of a pixel in a region different from the candidate region.

Also, the pixel value of a pixel in the detection image is larger when the pixel is at the same position as a pixel in the candidate region that is estimated to be highly possible that a face of a person is included. The face information map generating unit 304 adds the detection images obtained in this manner to generate one image and normalizes the image, which is regarded as a face information map. Thus, on the face information map, the pixel value of a pixel in the same region as the region where a plurality of candidate regions of the input image partly overlap is large, and it is more highly possible that a face is included. Additionally, the normalization is performed so that the pixel values of pixels of the face information map are values in the range from 0 to 255, for example.

According to the face information map obtained in this manner, a region of a face of a person as a subject can be easily detected in an input image.

In step S292, the subject map generating unit 274 generates a subject map by using the luminance information map, the color information maps, and the face information map supplied from the luminance information map generating unit 294, the color information map generating unit 301, the color information map generating unit 302, and the face information map generating unit 304.

For example, the subject map generating unit 274 linearly couples the individual information maps by using weights predetermined for the respective information maps, and furthermore multiplies the pixel values of the map obtained thereby by a predetermined weight to normalize it, so as to generate a subject map.

That is, when a target position (pixel) on the subject map to be obtained is regarded as a target position, the pixel values at the position (pixel) same as the target position of the individual information maps are multiplied by weights of the respective information maps, and the sum of the pixel values multiplied by the weights is regarded as the pixel value of the target position. Furthermore, the pixel values at the respective positions of the subject map obtained in this manner are multiplied by a weight predetermined for the subject map so that normalization is performed, whereby a final subject map is generated.

Additionally, more specifically, a subject map is generated by using a color information map of RG difference and a color information map of BY difference as color information maps. Also, the normalization is performed so that the pixel values of respective pixels of the subject map are values in the range from 0 to 1.

After generating the subject map, the subject map generating unit 274 supplies the generated subject map to the degree-of-blur detecting unit 21, the edge complexity detecting unit 61 to the color bias detecting unit 64, and the selecting unit 22, and the region-of-regard detection process ends. After the region-of-regard detection process ends, then the process proceeds to step S232 in FIG. 22.

In this way, the region-of-regard detecting unit 241 generates a subject map for specifying a region of regard of the input image and outputs it. Accordingly, in the image processing apparatus 231, a more effective image processing operation can be performed on each of a region of regard that draws the attention of a user and a background region, which is the other region, in the input image. As a result, an output image can be displayed more effectively.

Additionally, according to the above description, a subject map is generated by extracting information about luminance, information about colors, and information about a face of a person from an input image. Alternatively, information about edges or information about motions may be extracted from an input image so as to use it for generating a subject map.

The above-described series of processes can be executed by hardware or software. In a case where the series of processes are executed by software, a program constituting the software is installed from a program recording medium into a computer incorporated in dedicated hardware or a multipurpose personal computer or the like capable of executing various functions by being installed with various programs.

Figure 24:
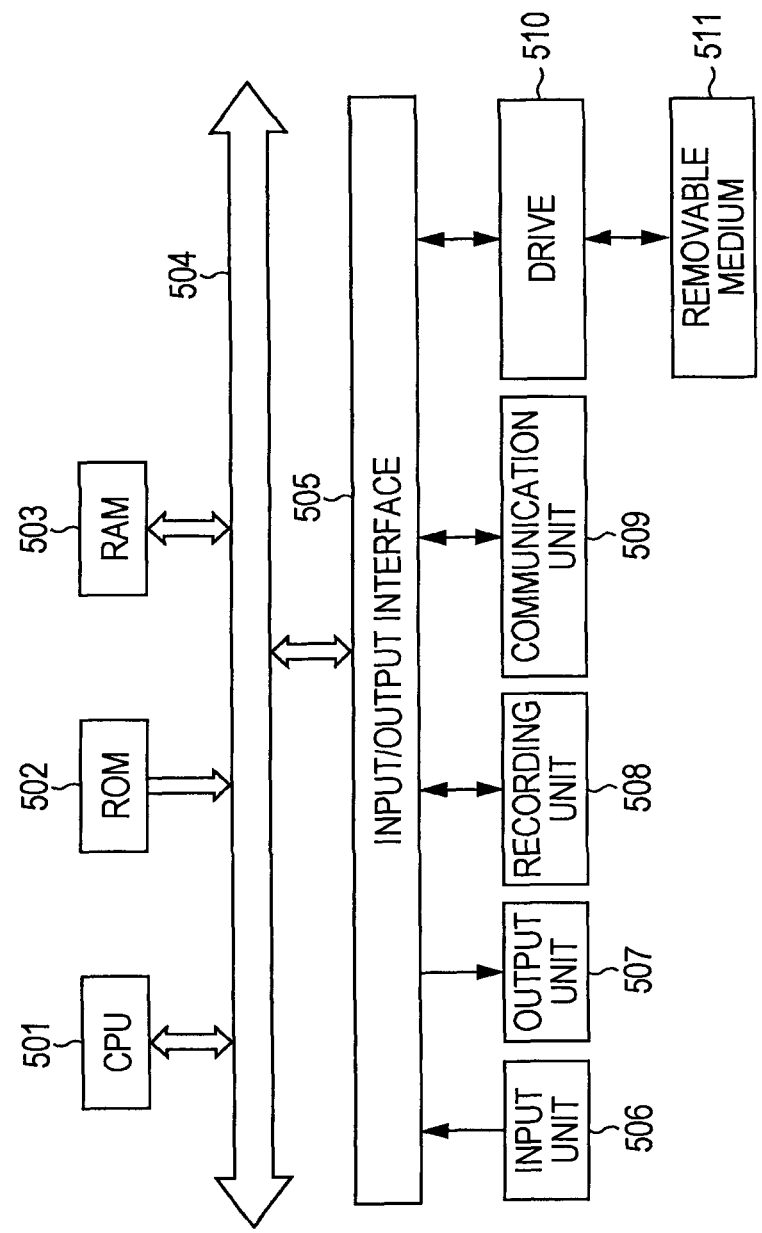
FIG. 24 is a diagram illustrating a configuration example of a computer.

FIG. 24 is a block diagram illustrating a hardware configuration example of a computer that executes the above-described series of processes in accordance with a program.

In the computer, a CPU (Central Processing Unit) 501, a ROM (Read Only Memory) 502, and a RAM (Random Access Memory) 503 are mutually connected via a bus 504.

Furthermore, an input/output interface 505 is connected to the bus 504. An input unit 506 including a keyboard, mouse, microphone, and the like, an output unit 507 including a display, speaker, and the like, a recording unit 508 including a hard disk, a nonvolatile memory, and the like, a communication unit 509 including a network interface and the like, and a drive 510 for driving a removable medium 511, such as a magnetic disk, optical disc, magneto-optical disc, or semiconductor memory, are connected to the input/output interface 505.

In the computer having the above-described configuration, the CPU 501 loads a program recorded on the recording unit 508 to the RAM 503 via the input/output interface 505 and the bus 504 and executes it, for example, whereby the above-described series of processes are performed.

The program executed by the computer (CPU 501) is provided while being recorded on the removable medium 511, which is a package medium including a magnetic disk (including a flexible disk), an optical disc (CD-ROM (Compact Disc-Read Only Memory), DVD (Digital Versatile Disc), etc.), a magneto-optical disc, a semiconductor memory, or the like, or via a wired or wireless transmission medium, such as a local area network, the Internet, or digital satellite broadcast.

Then, the program can be installed into the recording unit 508 via the input/output interface 505 by loading the removable medium 511 into the drive 510. Also, the program can be received by the communication unit 509 via a wired or wireless transmission medium and can be installed into the recording unit 508. Alternatively, the program can be installed in advance in the ROM 502 or the recording unit 508.

Additionally, the program executed by the computer may be a program in which processes are performed in time series in accordance with the order described in this specification, or may be a program in which processes are performed in parallel or at necessary timing, e.g., when the program is called.

Note that the embodiments of the present invention are not limited to the above-described embodiments, and various changes are acceptable without deviating from the scope of the present invention.

REFERENCE SIGNS LIST 11 image processing apparatus
21 degree-of-blur detecting unit
22 selecting unit
23 comic-style conversion unit
24 animation-style conversion unit
25 diorama-style conversion unit
26 painting-style conversion unit
27 painting-style conversion unit
28 sharpness processing unit
51 image processing apparatus
61 edge complexity detecting unit
62 size detecting unit
63 color distribution complexity detecting unit
64 color bias detecting unit
231 image processing apparatus
241 region-of-regard detecting unit

The invention claimed is:

1. An image processing apparatus comprising circuitry configured to:
   detect a degree of blur of an input image on the basis of the input image;
   select any of a plurality of image processing operations for subjecting the input image to processing by reducing an information amount of information included in the input image on the basis of a detection result of the degree of blur, wherein if a value indicating the degree of blur is equal to or larger than a predetermined threshold, the selection is made from a first group of determined image processing operations, and if the value is smaller than the threshold, the selection is made from a second group of predetermined image processing operations; and
   perform the selected image processing operation on the input image.

2. The image processing apparatus according to claim 1, wherein performing the selected image comprises reducing at least one of a resolution of the input image, colors, the number of gradation levels of a pixel value of a pixel of the input image, a texture, edges, and a bit rate.

3. The image processing apparatus according to claim 1, wherein the circuitry selects an image processing operation on the basis of the value indicating the degree of blur and frequencies of past selection of the respective image processing operations.

4. An image processing method for an image processing apparatus comprising:
   detecting a degree of blur of an input image on the basis of the input image,
   selecting any of a plurality of image processing operations for subjecting the input image to processing by reducing an information amount of information included in the input image on the basis of a detection result of the degree of blur, wherein if a value indicating the degree of blur is equal to or larger than a predetermined threshold, the selection is made from a first group of determined image processing operations, and if the value is smaller than the threshold, the selection is made from a second group of predetermined image processing operations, and performing the selected image processing operation on the input image.

5. A non-transitory, computer-readable medium comprising instructions for causing a computer to execute a process including the steps of:

detecting a degree of blur of an input image on the basis of the input image;

selecting any of a plurality of image processing operations for subjecting the input image to processing by reducing an information amount of information included in the input image on the basis of a detection result of the degree of blur, wherein if a value indicating the degree of blur is equal to or larger than a predetermined threshold, the selection is made from a first group of determined image processing operations, and if the value is smaller than the threshold, the selection is made from a second group of predetermined image processing operations; and performing the selected image processing operation on the input image.

6. An image processing apparatus comprising:

an extracting unit for extracting feature quantities of a plurality of features from an input image on the basis of the input image;

a selecting unit for selecting any of a plurality of image processing operations for subjecting the input image to processing by reducing an information amount of information included in the input image on the basis of the feature quantities of the plurality of features, wherein if a value indicating the degree of blur is equal to or larger than a predetermined threshold, the selection is made from a first group of determined image processing operations, and if the value is smaller than the threshold, the selection is made from a second group of predetermined image processing operations; and an image processing unit for performing the selected image processing operation on the input image.

7. The image processing apparatus according to claim 6, wherein at least one of a resolution of the input image, a color distribution, a color bias, the number of gradation levels of a pixel value of a pixel of the input image, a degree of blur, an edge quantity, an edge distribution, a texture quantity, and a texture distribution is extracted as the feature quantity from the input image.

8. An image processing apparatus comprising:

hardware configured to generate subject specifying information for specifying a region of a subject in an input image;

hardware configured to detect, on the basis of the input image and the subject specifying information, a degree of blur of a subject region, which is the region of the subject in the input image, and a degree of blur of a background region, which is a region other than the subject region in the input image;

hardware configured to extract a feature quantity of a plurality of features different from the degrees of blur from the subject region and the background region on the basis of the input image;

hardware configured to select any of a plurality of image processing operations for subjecting the input image to processing by reducing an information amount of information included in the input image on the basis of the degrees of blur and the feature quantity, wherein if a value indicating the degree of blur is equal to or larger than a predetermined threshold, the selection is made from a first group of determined image processing operations, and if the value is smaller than the threshold, the selection is made from a second group of predetermined image processing operations; and image processing means for performing the selected image processing operation on at least one of the subject region and the background region of the input image.

9. The image processing apparatus according to claim 8, wherein selecting further comprises selecting image processing operations for the subject region and the background region, respectively, and wherein the image processing means performs the selected image processing operations on the subject region and the background region, respectively.

10. The image processing apparatus according to claim 8, wherein selecting further comprises selecting an image processing operation for a region having a higher degree of blur among the subject region and the background region, and wherein the image processing means performs the selected image processing operation on the region having a higher degree of blur.

* * * * *